(12) United States Patent
Nishikawa et al.

(10) Patent No.: US 9,230,533 B2
(45) Date of Patent: Jan. 5, 2016

(54) SOUND ABSORBING BODY AND MANUFACTURING METHOD THEREOF

(76) Inventors: Yukihiro Nishikawa, Nara (JP);
Yoshiko Nishikawa, Nara (JP)

( * ) Notice: Subject to any disclaimer, the term of this patent is extended or adjusted under 35 U.S.C. 154(b) by 0 days.

(21) Appl. No.: 13/378,398

(22) PCT Filed: Jun. 9, 2010

(86) PCT No.: PCT/JP2010/059738
§ 371 (c)(1),
(2), (4) Date: Feb. 28, 2012

(87) PCT Pub. No.: WO2010/147033
PCT Pub. Date: Dec. 23, 2010

(65) Prior Publication Data
US 2012/0146259 A1    Jun. 14, 2012

(30) Foreign Application Priority Data
Jun. 16, 2009    (JP) ................................. 2009-143759

(51) Int. Cl.
*B29C 67/20* (2006.01)
*G10K 11/162* (2006.01)
*B29C 44/56* (2006.01)

(52) U.S. Cl.
CPC .......... *G10K 11/162* (2013.01); *B29C 44/5636* (2013.01); *Y10T 428/24273* (2015.01)

(58) Field of Classification Search
USPC .............. 264/321, 299, 319, 325, 328.1, 241, 264/413, 415, 37.15, 41, 45.1, 46.1, 46.2, 264/50, 51, 628
See application file for complete search history.

(56) References Cited

U.S. PATENT DOCUMENTS

| | | | | |
|---|---|---|---|---|
| 3,002,248 A | * | 10/1961 | Willson | 425/84 |
| 4,615,411 A | * | 10/1986 | Breitscheidel et al. | 181/224 |
| 4,786,351 A | * | 11/1988 | Elliott et al. | 156/245 |
| 5,064,714 A | * | 11/1991 | Yamaguchi et al. | 428/219 |
| 5,108,691 A | * | 4/1992 | Elliott | 264/554 |
| 2007/0166527 A1 | | 7/2007 | Yabe et al. | |
| 2007/0232711 A1 | * | 10/2007 | Frei et al. | 521/128 |

FOREIGN PATENT DOCUMENTS

| | | | |
|---|---|---|---|
| JP | 55-70899 A | | 5/1980 |
| JP | 59-102294 A | | 6/1984 |
| JP | 04271972 | * | 9/1992 |
| JP | 6-67676 A | | 3/1994 |
| JP | 10-119220 A | | 5/1998 |
| JP | 2001-249666 A | | 9/2001 |
| JP | 2002-297150 A | | 10/2002 |
| JP | 2005-192634 A | | 7/2005 |

(Continued)

*Primary Examiner* — Stella Yi
(74) *Attorney, Agent, or Firm* — McDermott Will & Emery LLP

(57) ABSTRACT

Sound-absorbing material is provided which is more effective for the same volume. A sound-absorbing body is formed characteristically by hot-compression molding of a raw material (C) comprises a flexible polyurethane foam to a volume ratio ranging from 1/1.5 to 1/12. In the molding, metal molds (A·B) are heated in an electric furnace up to a set temperature of 180° C.; the flexible polyurethane foam of the cell number of 50 is held between the metal molds (A·B), and compressed and heated in the electric furnace in this state at 180° C. for 60 minutes; the fixing clamp is removed; and the hot-compressed urethane foam is taken out to obtain the intended sound-absorbing body.

2 Claims, 25 Drawing Sheets

(56) References Cited

FOREIGN PATENT DOCUMENTS

| JP | 2005307109 | * 11/2005 |
| JP | 2005-331684 A | 12/2005 |
| JP | 2008-24773 A | 2/2008 |
| JP | 2008-32977 A | 2/2008 |

* cited by examiner

FIG. 1
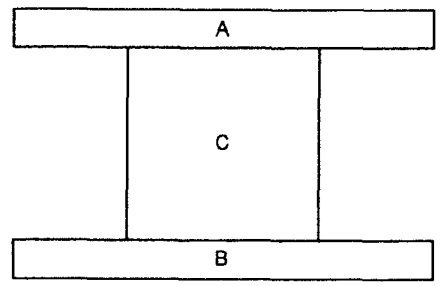
FIG. 2
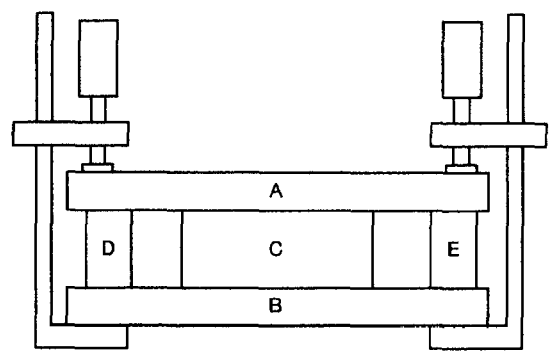
FIG. 3    Cells: 13, Thickness: 240 mm
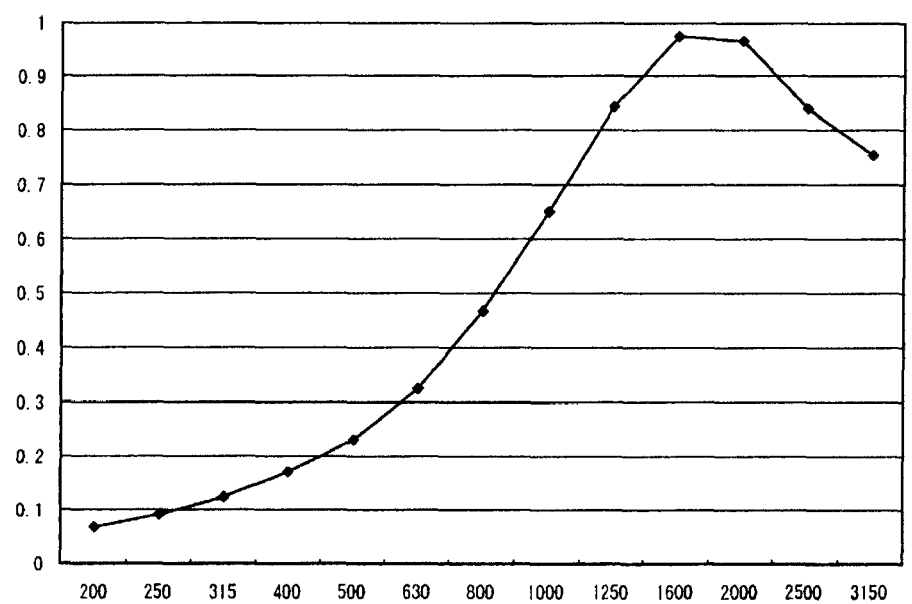

Cells: 13, Thickness: 210 mm

Cells: 13, Thickness: 180 mm

Cells: 13, Thickness: 90 mm

Cells: 13, Thickness: 60 mm

Cells: 40, Thickness: 180 mm

Cells: 40, Thickness: 150 mm

Cells: 80, Thickness: 30 mm

SOUND ABSORBING BODY AND MANUFACTURING METHOD THEREOF

CROSS REFERENCE TO PRIOR APPLICATIONS

This application is a U.S. National Phase application under 35 U.S.C. §371 of International Application No. PCT/JP2010/059738, filed on Jun. 9, 2010 and claims benefit of priority to Japanese Patent Application No. 2009-143759, filed on Jun. 16, 2009. The International Application was published in Japanese on Dec. 23, 2010 as WO 2010/147033 A1 under PCT Article 21(2). All of these applications are herein incorporated by reference.

FIELD OF TECHNOLOGY

The present invention relates to a sound absorbing body that uses soft polyurethane foam, and to a manufacturing method thereof.

BACKGROUND

Conventionally, fibrous substances, such as fiberglass, and foam bodies, such as urethane foam, have been used broadly as sound absorbing bodies (See Japanese Patent 3388681). Moreover, the typical method to increase the sound absorbing effect has been to increase the volume.

However, in the method of increasing the volume, as described above, there is a problem in terms of the effective utilization of space, because it is necessary to increase the volume of the sound absorbing body in order to obtain the sound absorbing effect.

The present invention focuses on the conventional problem, set forth above, and the object of the invention is to provide a more effective sound absorbing body, even if the volume remains the same.

SUMMARY

A distinctive feature of the sound absorbing body according to the present invention is in the hot compression molding of a raw material, made from soft polyurethane foam, to a volume ratio of between 1/1.5 and 1/12. Moreover, a distinctive feature of the sound absorbing body manufacturing method according to the present example is in the manufacturing of a sound absorbing body by hot compression molding of a raw material, made from soft polyurethane foam, to a volume ratio of between 1/1.5 and 1/12.

When compared to the prior art, the present example, structured as set forth above, is able to exhibit more effective sound absorbing effects, even with the same volume.

Note that the preferably the soft polyurethane foam that is the raw material of the sound absorbing body has a cell count between 10 and 80.

Moreover, preferably the surface of the sound absorbing body has a film applied thereto, is painted, or is subjected to a flocking process, enabling a further increase the sound absorbing effect in the middle and low range through the film on the surface, or enabling suitability for use in locations that are often within direct eyesight, such as within rooms, through the application of decorations through the flocking process or the painting.

A hot compression process can be performed using a molding die wherein there are raised and recessed portions, or decorations, on the surface of the die for performing the hot compression molding of the raw material the soft polyurethane foam) for the sound absorbing body, thereby enabling diffusion of the incident sound by the raised and recessed portions of the surface, and enabling suitability for use in locations that are often within direct eyesight, such as within rooms, through the application of decorations.

Moreover, a hot pressing device or an electric furnace and a mold that uses a die for molding may be used as the molding device for molding the polyurethane foam. Moreover, the molding temperature is (preferably between 150 and 240° C. Furthermore, although the compression time is determined by the volume of the polyurethane foam and the physical properties thereof, in consideration of workability and degradation, preferably the time is as short as is possible.

The sound absorbing body according to the present example uses, as the sound absorbing material, polyurethane foam that has a desired compression rate thus enabling installation of effective sound absorbing material in locations where in conventionally there has been little effect due to being able to provide only a small amount of sound absorbing material due to space problems, and enables miniaturization of machinery that has had to be large due to the need for a given sound absorbing effect, and in addition to saving space and conserving resources, also makes it possible to provide substantially more effective sound absorbing performance using sound absorbing material of the same volume. Moreover, the application of designs to the surface of the sound absorbing material, such as patterns that have been difficult with a profiling process, can be performed easily with a single step through processing with a molding die, enabling processing with superior design properties on sound absorbing materials which, conventionally, have been lacking decoration. Moreover, when compared using the same volume, compressed objects, such as in the present invention, have better middle and low range sound absorbing effects than the conventional non-compressed objects. Moreover, while the sound absorbing effects in the high range are reduced through the application of a film on the surface of the sound absorbing material, doing so can increase the sound absorbing effects in the middle and low range.

BRIEF DESCRIPTION OF THE DRAWINGS

FIG. 1 is a schematic front view diagram of an example of a sound absorbing body manufacturing method according to an example according to the present invention.

FIG. 2 is a schematic front view diagram of an example of a sound absorbing body manufacturing method according to an example of the present invention.

FIG. 3 is a graph indicating the sound absorption rate, at various frequencies, of a sound absorbing body (number of cells: 13, thickness: 240 mm) according to an example according to the present invention.

DETAILED DESCRIPTION

Examples for carrying out the present invention will be explained below, in reference to the drawings.

Figure 4:
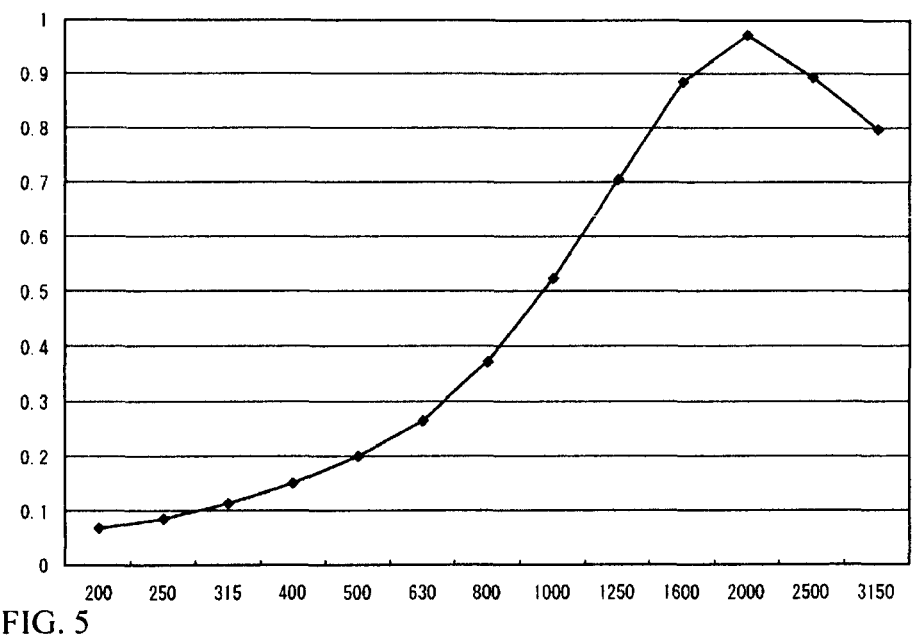
FIG. 4 is a graph indicating the sound absorption rate, at various frequencies, of a sound absorbing body (number of cells: 13, thickness: 210 mm) according to an example according to the present invention.
Figure 5:
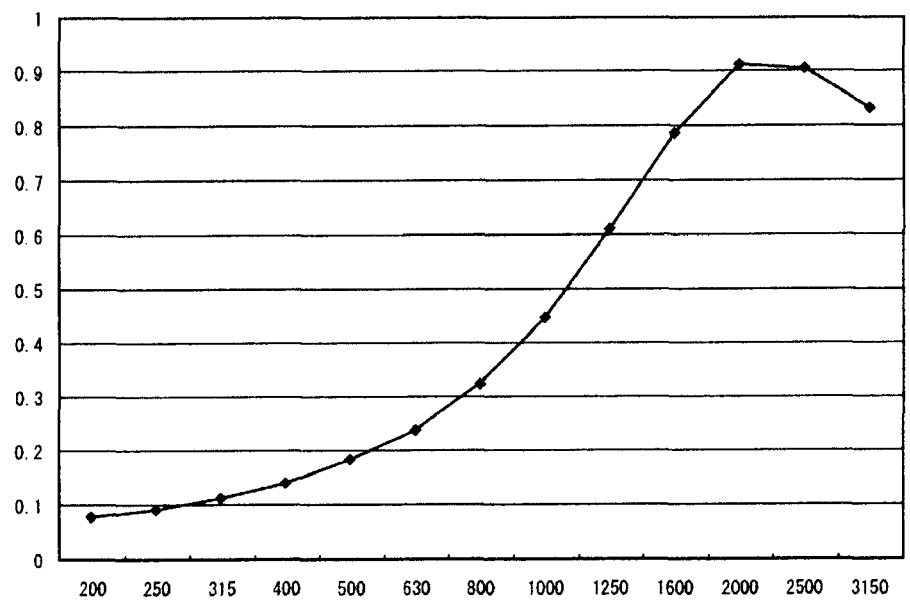
FIG. 5 is a graph indicating the sound absorption rate, at various frequencies, of a sound absorbing body (number of cells: 13, thickness: 180 mm) according to an example according to the present invention.
Figure 6:
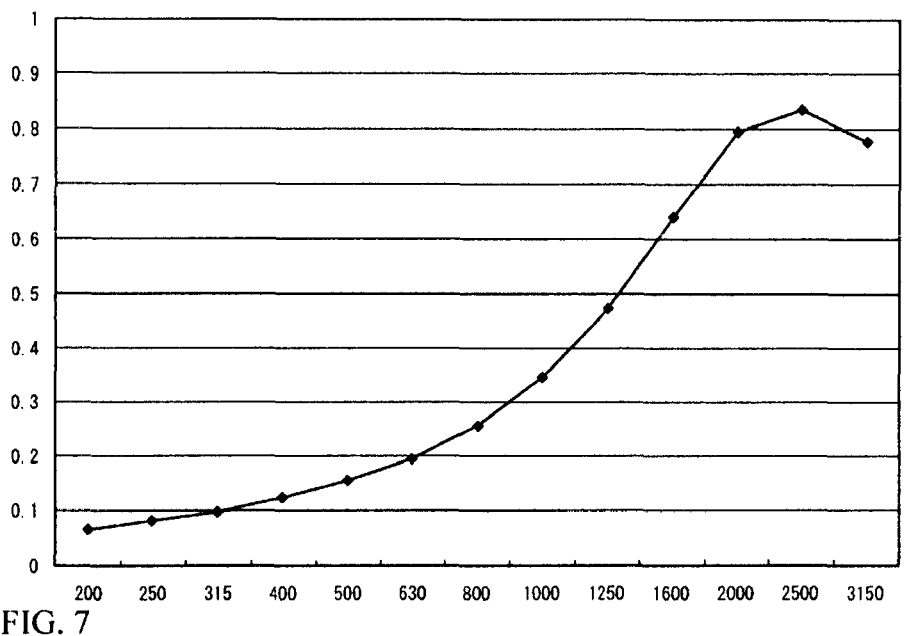
FIG. 6 is a graph indicating the sound absorption rate, at various frequencies, of a sound absorbing body (number of cells: 13, thickness: 150 mm) according to an example according to the present invention.
Figure 7:
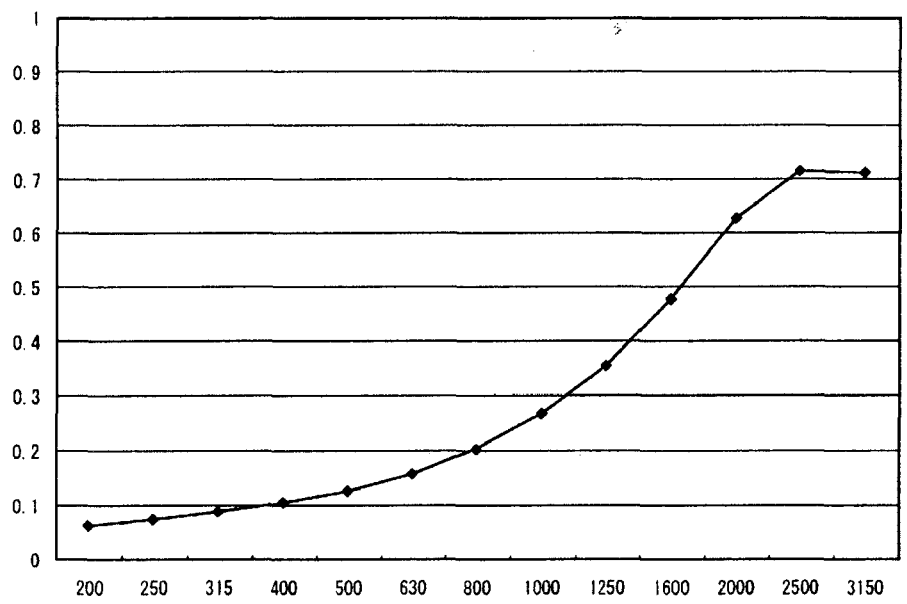
FIG. 7 is a graph indicating the sound absorption rate, at various frequencies, of a sound absorbing body (number of cells: 13, thickness: 120 mm) according to an example according to the present invention.
Figure 8:
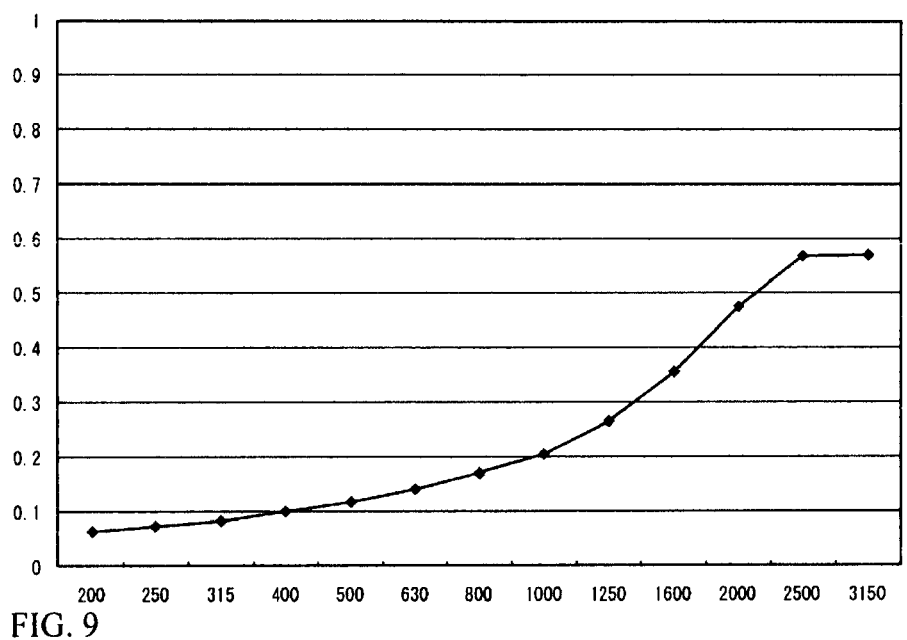
FIG. 8 is a graph indicating the sound absorption rate, at various frequencies, of a sound absorbing body (number of cells: 13, thickness: 90 mm) according to an example according to the present invention.
Figure 9:
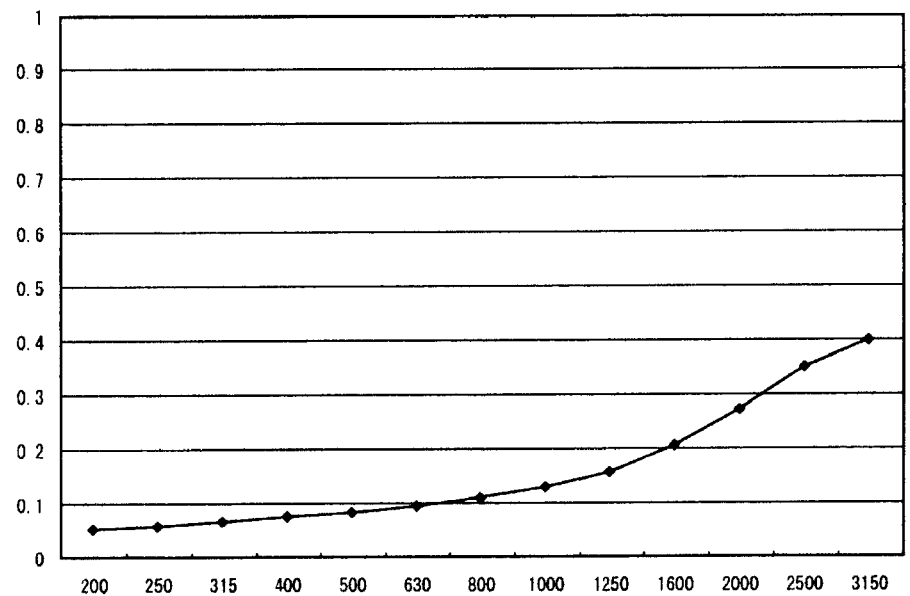
FIG. 9 is a graph indicating the sound absorption rate, at various frequencies, of a sound absorbing body (number of cells: 13, thickness: 60 mm) according to an example according to the present invention.
Figure 10:
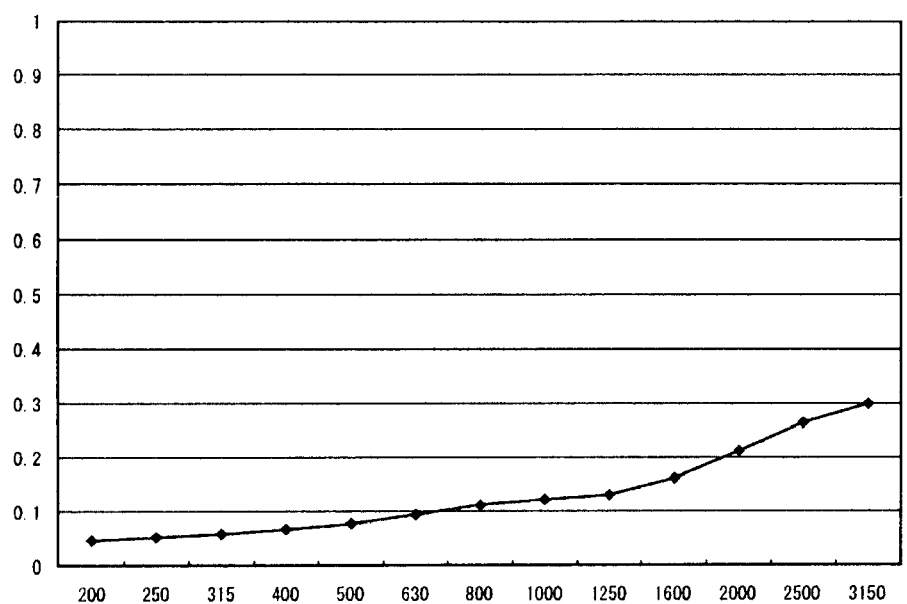
FIG. 10 is a graph indicating the sound absorption rate, at various frequencies, of a sound absorbing body (number of cells: 13, thickness: 45 mm) according to an example according to the present invention.
Figure 11:
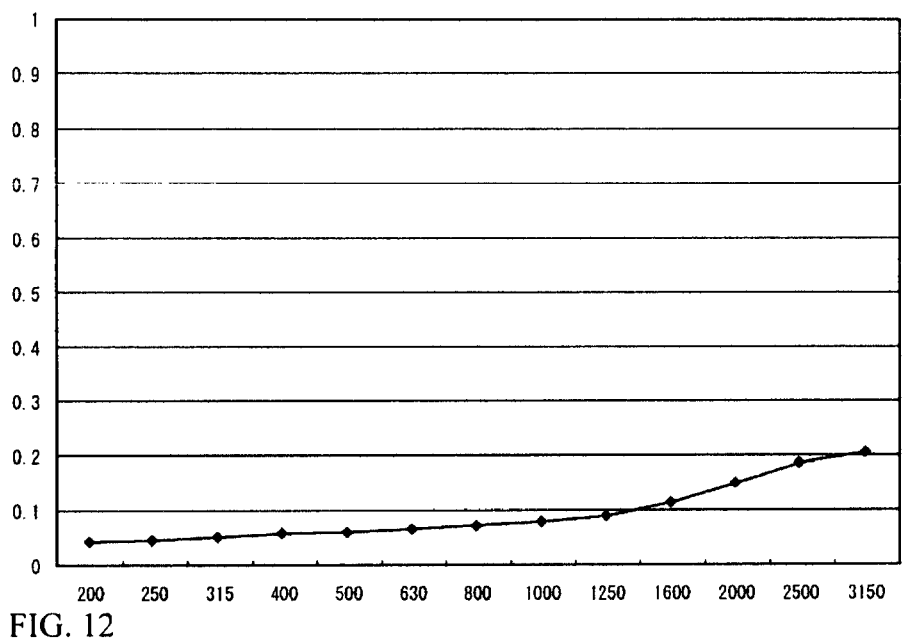
FIG. 11 is a graph indicating the sound absorption rate, at various frequencies, of a non-compressed soft polyurethane foam with 13 cells and a thickness of 30 mm.

FIG. 1 is a schematic front view diagram of an example of a sound absorbing body manufacturing method according to an example according to the present invention; FIG. 2 is a schematic front view diagram of an example of a sound absorbing body manufacturing method according to an example of the present invention; FIG. 3 is a graph indicating the sound absorption rate, at various frequencies, of a sound absorbing body (number of cells: 13, thickness: 240 mm) according to an example according to the present invention; FIG. 4 is a graph indicating the sound absorption rate, at various frequencies, of a sound absorbing body (number of cells: 13, thickness: 210 mm) according to an example according to the present invention; FIG. 5 is a graph indicating the sound absorption rate, at various frequencies, of a sound absorbing body (number of cells: 13, thickness: 180 mm) according to an example according to the present invention; FIG. 6 is a graph indicating the sound absorption rate, at various frequencies, of a sound absorbing body (number of cells: 13, thickness: 150 mm) according to an example according to the present invention; FIG. 7 is a graph indicating the sound absorption rate, at various frequencies, of a sound absorbing body (number of cells: 13, thickness: 120 mm) according to an example according to the present invention; FIG. 8 is a graph indicating the sound absorption rate, at various frequencies, of a sound absorbing body (number of cells: 13, thickness: 90 mm) according to an example according to the present invention; FIG. 9 is a graph indicating the sound absorption rate, at various frequencies, of a sound absorbing body (number of cells: 13, thickness: 60 mm) according to an example according to the present invention; FIG. 10 is a graph indicating the sound absorption rate, at various frequencies, of a sound absorbing body (number of cells: 13, thickness: 45 mm) according to an example according to the present invention; and FIG. 11 is a graph indicating the sound absorption rate, at various frequencies, of a non-compressed soft polyurethane foam with 13 cells and a thickness of 30 mm.

Figure 12:
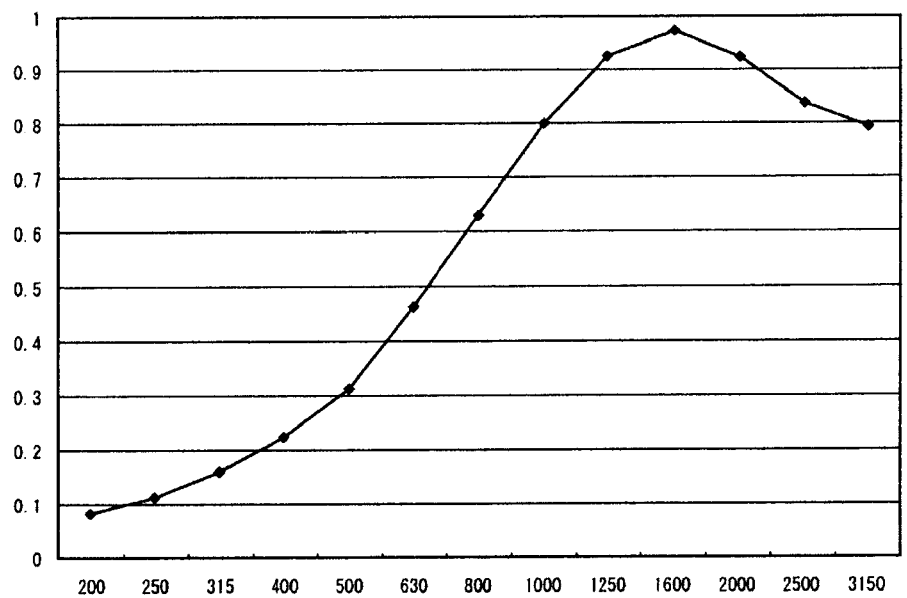
FIG. 12 is a graph indicating the sound absorption rate, at various frequencies, of a sound absorbing body (number of cells: 20, thickness: 240 mm) according to an example according to the present invention.
Figure 13:
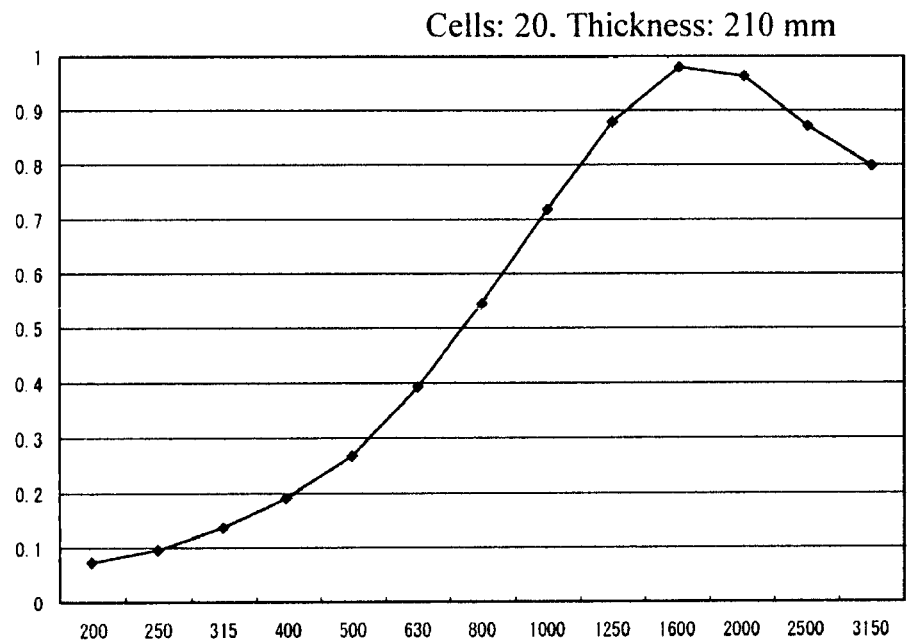
FIG. 13 is a graph indicating the sound absorption rate, at various frequencies, of a sound absorbing body (number of cells: 20, thickness: 210 mm) according to an example according to the present invention.
Figure 14:
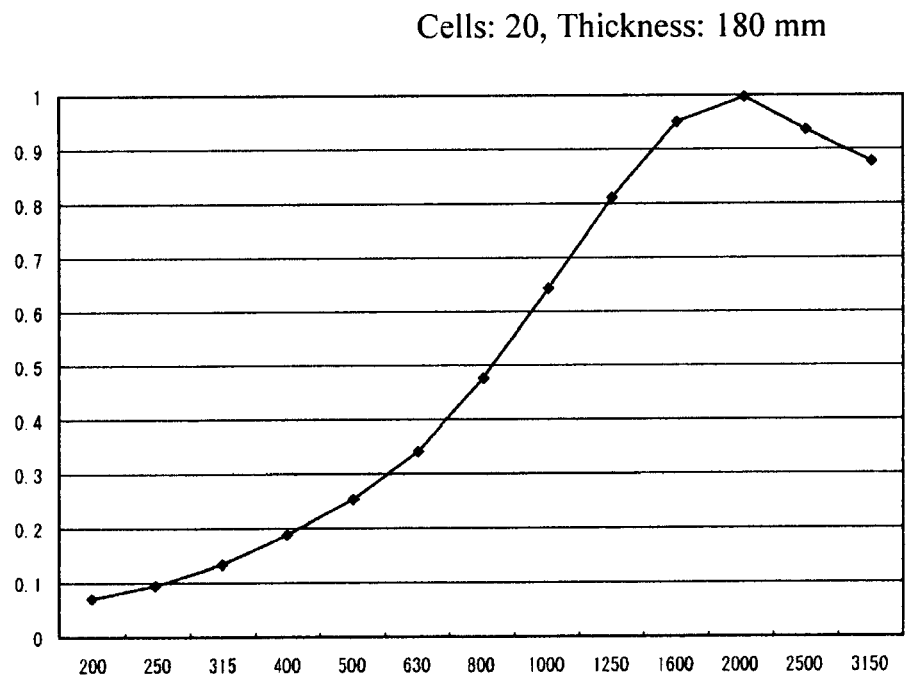
FIG. 14 is a graph indicating the sound absorption rate, at various frequencies, of a sound absorbing body (number of cells: 20, thickness: 180 mm) according to an example according to the present invention.
Figure 15:
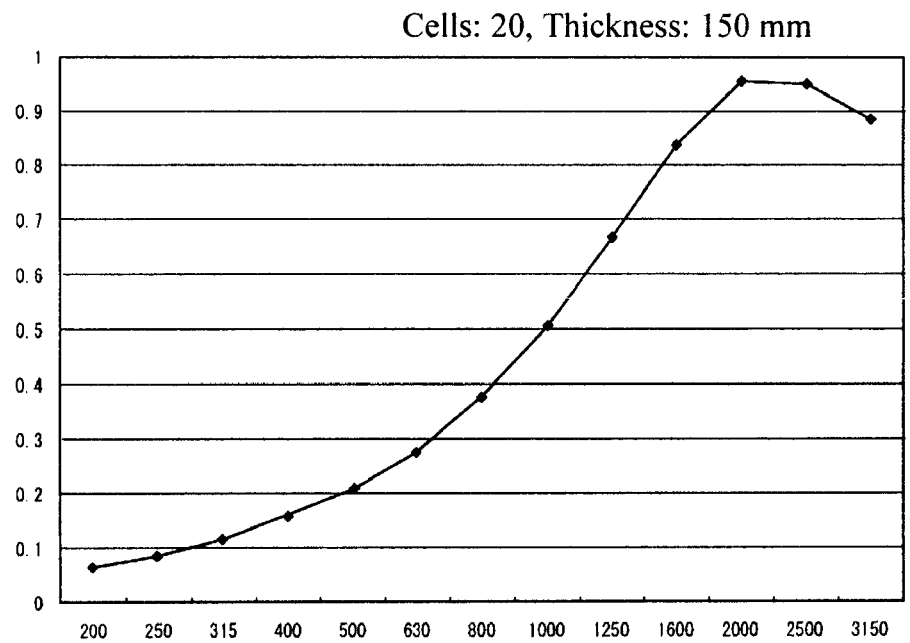
FIG. 15 is a graph indicating the sound absorption rate, at various frequencies, of a sound absorbing body (number of cells: 20, thickness: 150 mm) according to an example according to the present invention.
Figure 16:
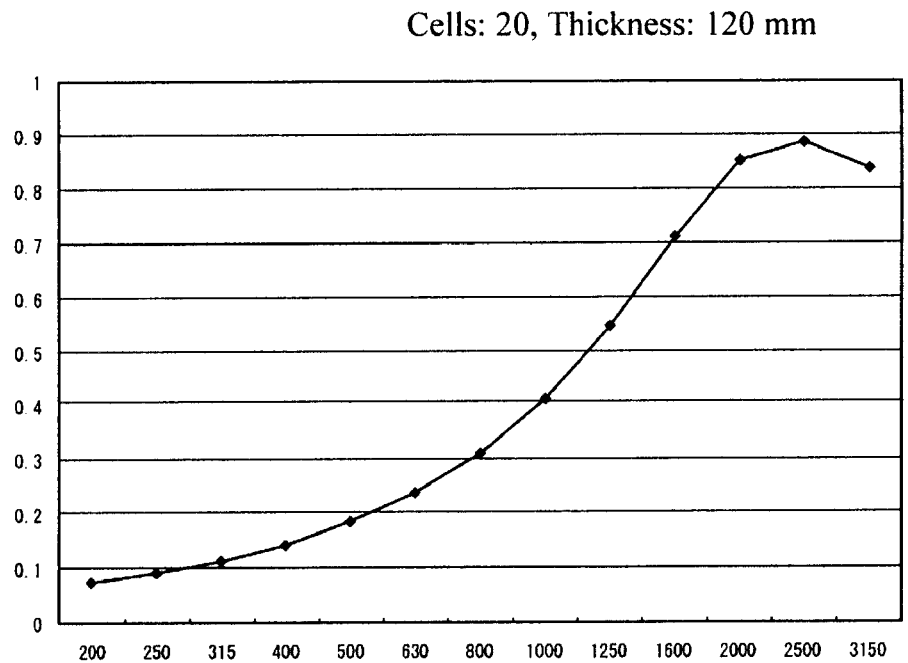
FIG. 16 is a graph indicating the sound absorption rate, at various frequencies, of a sound absorbing body (number of cells: 20, thickness: 120 mm) according to an example according to the present invention.
Figure 17:
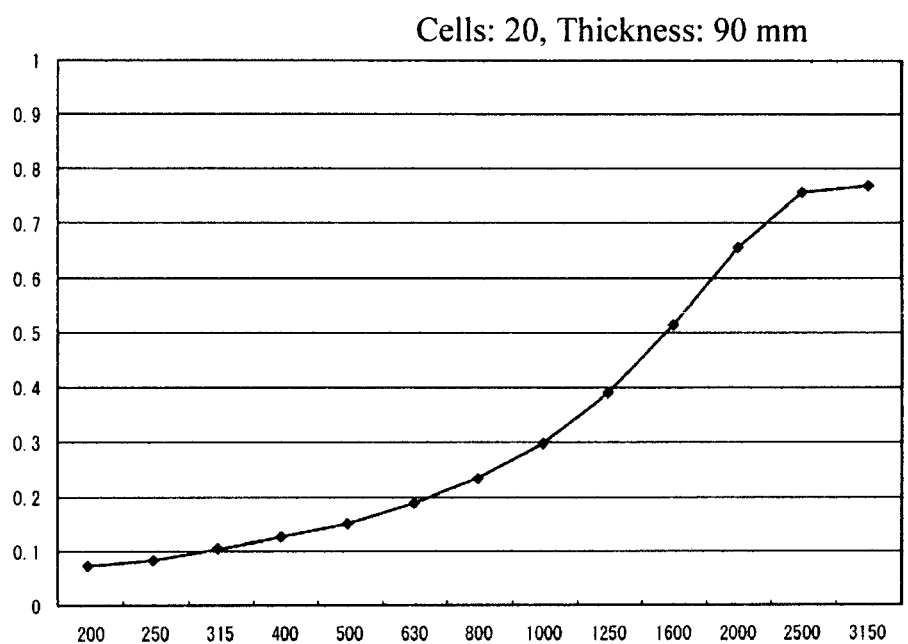
FIG. 17 is a graph indicating the sound absorption rate, at various frequencies, of a sound absorbing body (number of cells: 20, thickness: 90 mm) according to an example according to the present invention.
Figure 18:
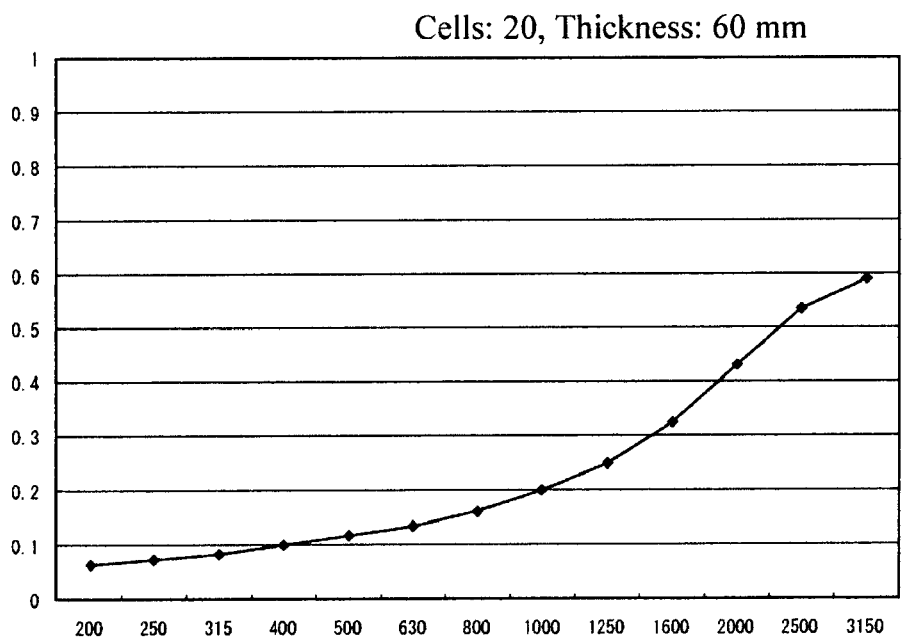
FIG. 18 is a graph indicating the sound absorption rate, at various frequencies, of a sound absorbing body (number of cells: 20, thickness: 60 mm) according to an example according to the present invention.
Figure 19:
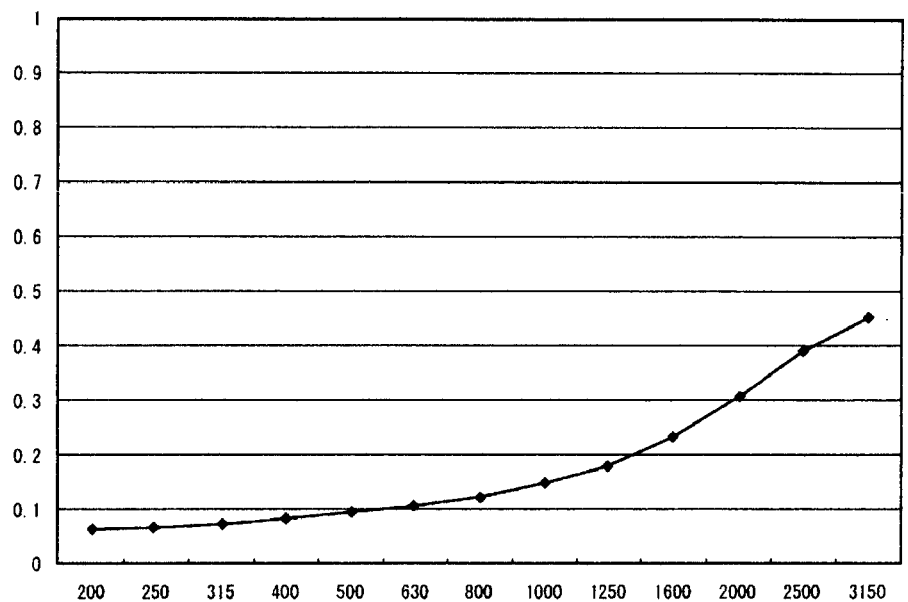
FIG. 19 is a graph indicating the sound absorption rate, at various frequencies, of a sound absorbing body (number of cells: 20, thickness: 45 mm) according to an example according to the present invention.
Figure 20:
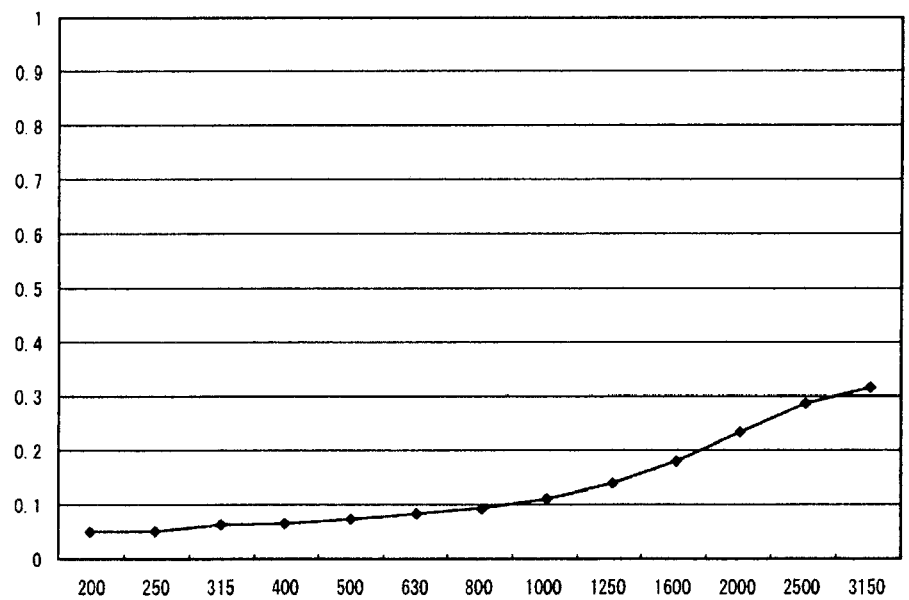
FIG. 20 is a graph indicating the sound absorption rate, at various frequencies, of a non-compressed soft polyurethane foam with 20 cells and a thickness of 30 mm.

FIG. 12 is a graph indicating the sound absorption rate, at various frequencies, of a sound absorbing body (number of cells: 20, thickness: 240 mm) according to an example according to the present invention; FIG. 13 is a graph indicating the sound absorption rate, at various frequencies, of a sound absorbing body (number of cells: 20, thickness: 210 mm) according to an example according to the present invention; FIG. 14 is a graph indicating the sound absorption rate, at various frequencies, of a sound absorbing body (number of cells: 20, thickness: 180 mm) according to an example according to the present invention; FIG. 15 is a graph indicating the sound absorption rate, at various frequencies, of a sound absorbing body (number of cells: 20, thickness: 150 mm) according to an example according to the present invention; FIG. 16 is a graph indicating the sound absorption rate, at various frequencies, of a sound absorbing body (number of cells: 20, thickness: 120 mm) according to an example according to the present invention; FIG. 17 is a graph indicating the sound absorption rate, at various frequencies, of a sound absorbing body (number of cells: 20, thickness: 90 mm) according to an example according to the present invention; FIG. 18 is a graph indicating the sound absorption rate, at various frequencies, of a sound absorbing body (number of cells: 20, thickness: 60 mm) according to an example according to the present invention; FIG. 19 is a graph indicating the sound absorption rate, at various frequencies, of a sound absorbing body (number of cells: 20, thickness: 45 mm) according to an example according to the present invention; and FIG. 20 is a graph indicating the sound absorption rate, at various frequencies, of a non-compressed soft polyurethane foam with 20 cells and a thickness of 30 mm.

Figure 21:
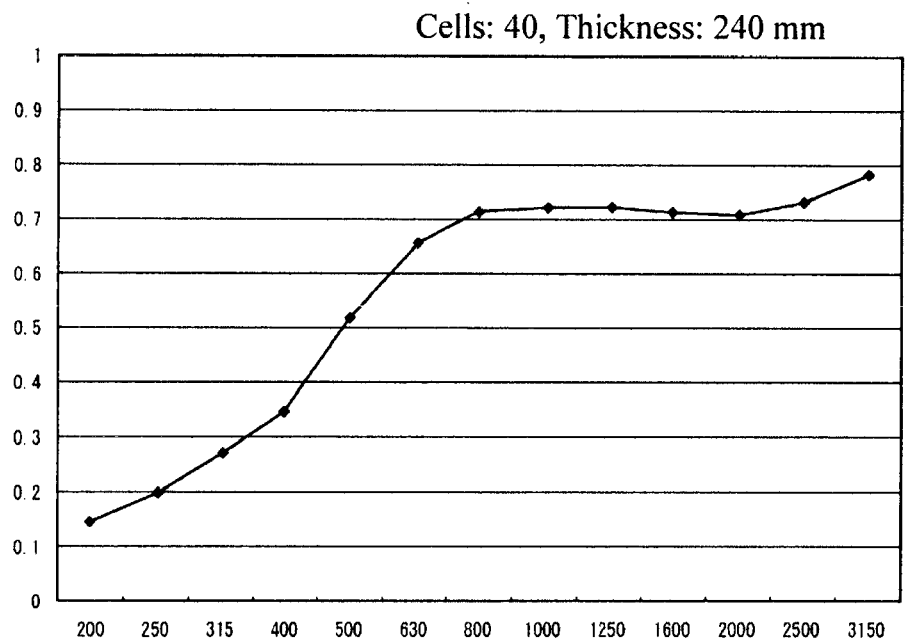
FIG. 21 is a graph indicating the sound absorption rate, at various frequencies, of a sound absorbing body (number of cells: 40, thickness: 240 mm) according to an example according to the present invention.
Figure 22:
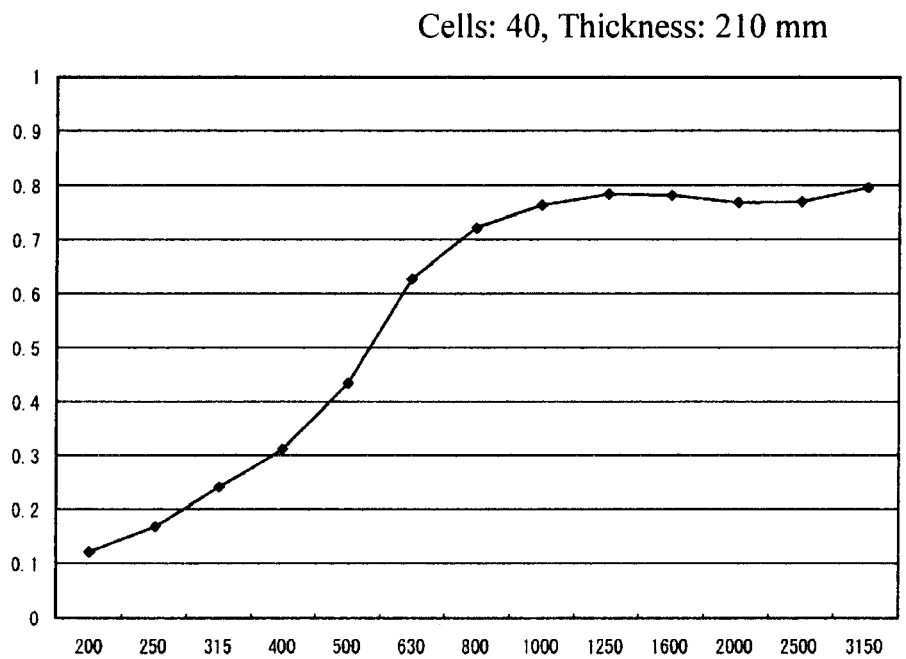
FIG. 22 is a graph indicating the sound absorption rate, at various frequencies, of a sound absorbing body (number of cells: 40, thickness: 210 mm) according to an example according to the present invention.
Figure 23:
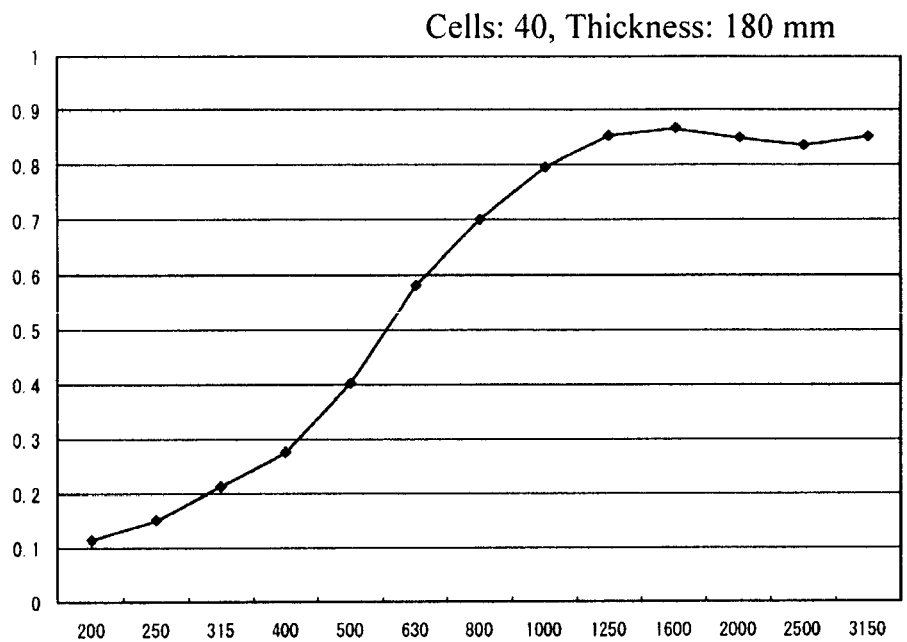
FIG. 23 is a graph indicating the sound absorption rate, at various frequencies, of a sound absorbing body (number of cells: 40, thickness: 180 mm) according to an example according to the present invention.
Figure 24:
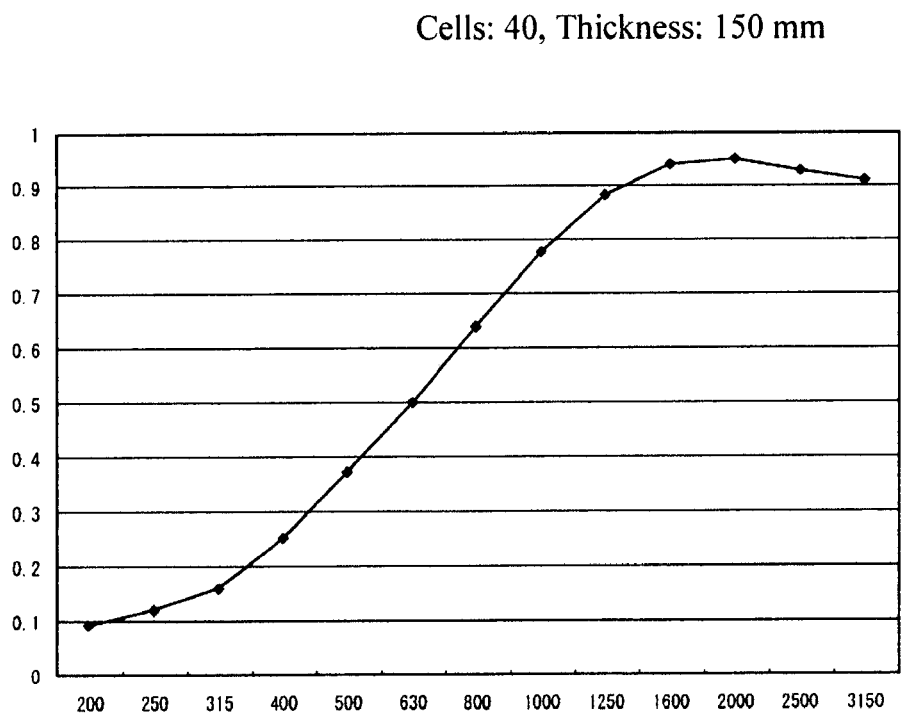
FIG. 24 is a graph indicating the sound absorption rate, at various frequencies, of a sound absorbing body (number of cells: 40, thickness: 150 mm) according to an example according to the present invention.
Figure 25:
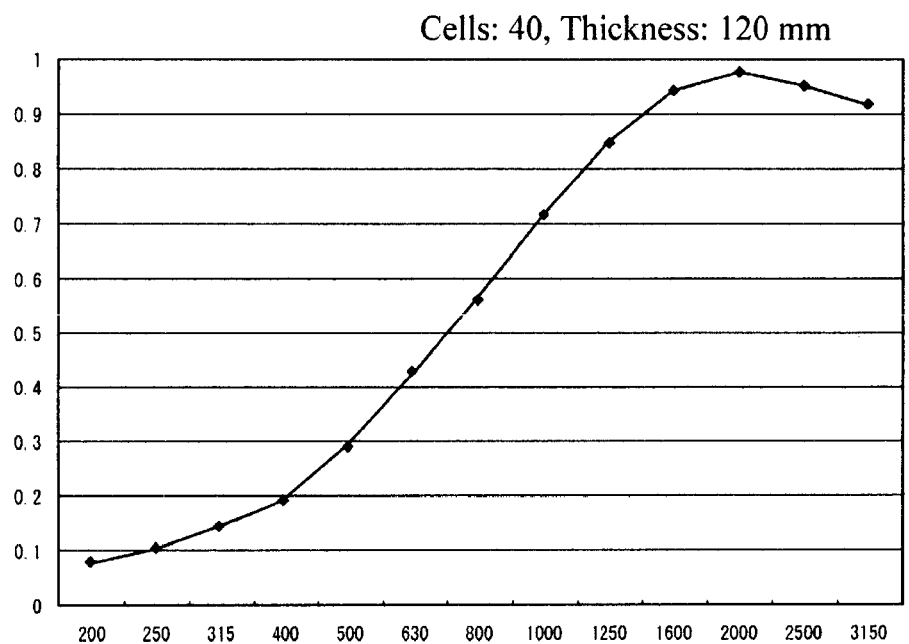
FIG. 25 is a graph indicating the sound absorption rate, at various frequencies, of a sound absorbing body (number of cells: 40, thickness: 120 mm) according to an example according to the present invention.
Figure 26:
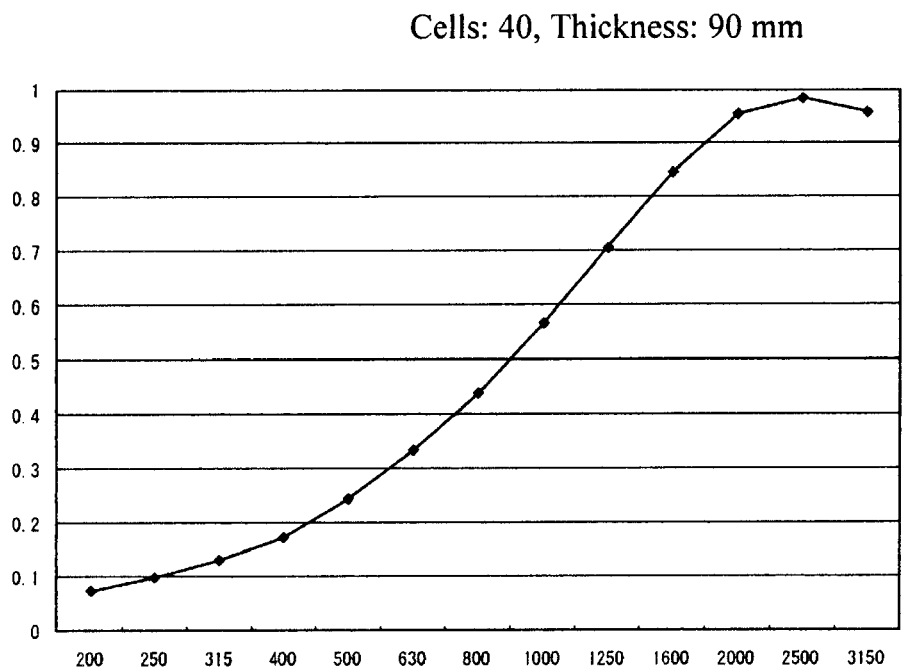
FIG. 26 is a graph indicating the sound absorption rate, at various frequencies, of a sound absorbing body (number of cells: 40, thickness: 90 mm) according to an example according to the present invention.
Figure 27:
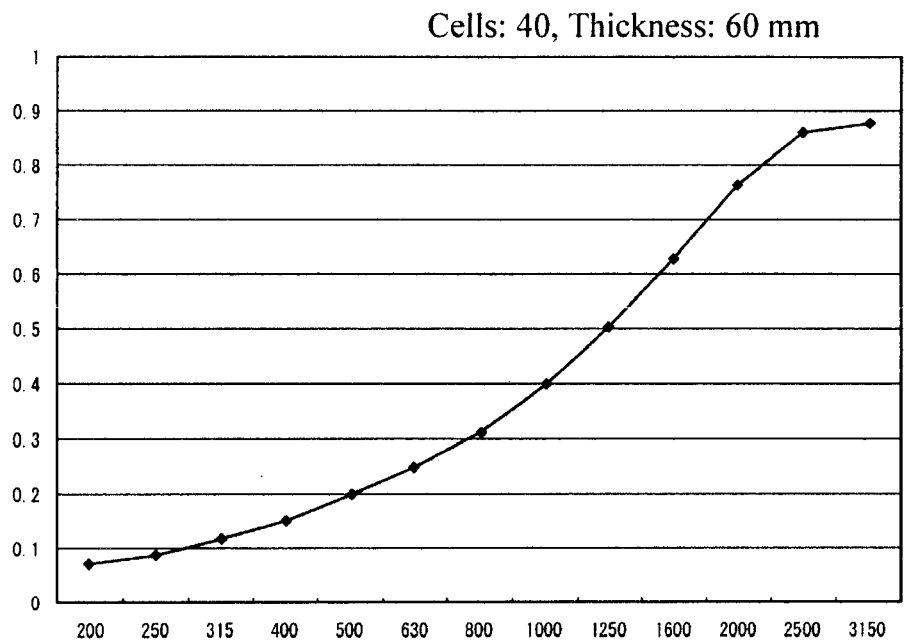
FIG. 27 is a graph indicating the sound absorption rate, at various frequencies, of a sound absorbing body (number of cells: 40, thickness: 60 mm) according to an example according to the present invention.
Figure 28:
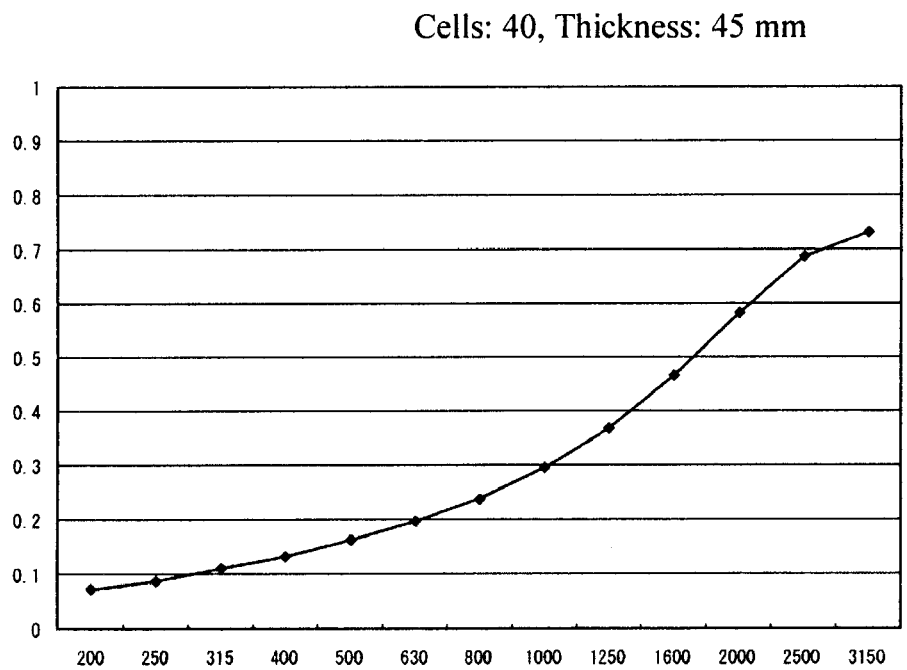
FIG. 28 is a graph indicating the sound absorption rate, at various frequencies, of a sound absorbing body (number of cells: 40, thickness: 45 mm) according to an example according to the present invention.
Figure 29:
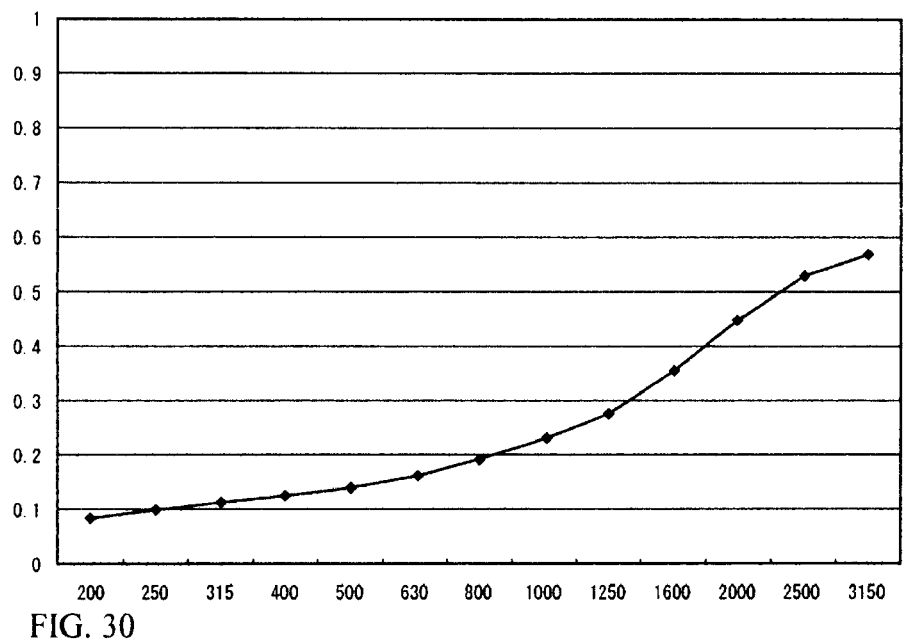
FIG. 29 is a graph indicating the sound absorption rate, at various frequencies, of a non-compressed soft polyurethane foam with 40 cells and a thickness of 30 mm.

FIG. 21 is a graph indicating the sound absorption rate, at various frequencies, of a sound absorbing body (number of cells: 40, thickness: 240 mm) according to an example according to the present invention; FIG. 22 is a graph indicating the sound absorption rate, at various frequencies, of a sound absorbing body (number of cells: 40, thickness: 210 mm) according to an example according to the present invention; FIG. 23 is a graph indicating the sound absorption rate, at various frequencies, of a sound absorbing body (number of cells: 40, thickness: 180 mm) according to an example according to the present invention; FIG. 24 is a graph indicating the sound absorption rate, at various frequencies, of a sound absorbing body (number of cells: 40, thickness: 150 mm) according to an example according to the present invention; FIG. 25 is a graph indicating the sound absorption rate, at various frequencies, of a sound absorbing body (number of cells: 40, thickness: 120 mm) according to an example according to the present invention; FIG. 26 is a graph indicating the sound absorption rate, at various frequencies, of a sound absorbing body (number of cells: 40, thickness: 90 mm) according to an example according to the present invention; FIG. 27 is a graph indicating the sound absorption rate, at various frequencies, of a sound absorbing body (number of cells: 40, thickness: 60 mm) according to an example according to the present invention; FIG. 28 is a graph indicating the sound absorption rate, at various frequencies, of a sound absorbing body (number of cells: 40, thickness: 45 mm) according to an example according to the present invention; and FIG. 29 is a graph indicating the sound absorption rate, at various frequencies, of a non-compressed soft polyurethane foam with 40 cells and a thickness of 30 mm.

Figure 30:
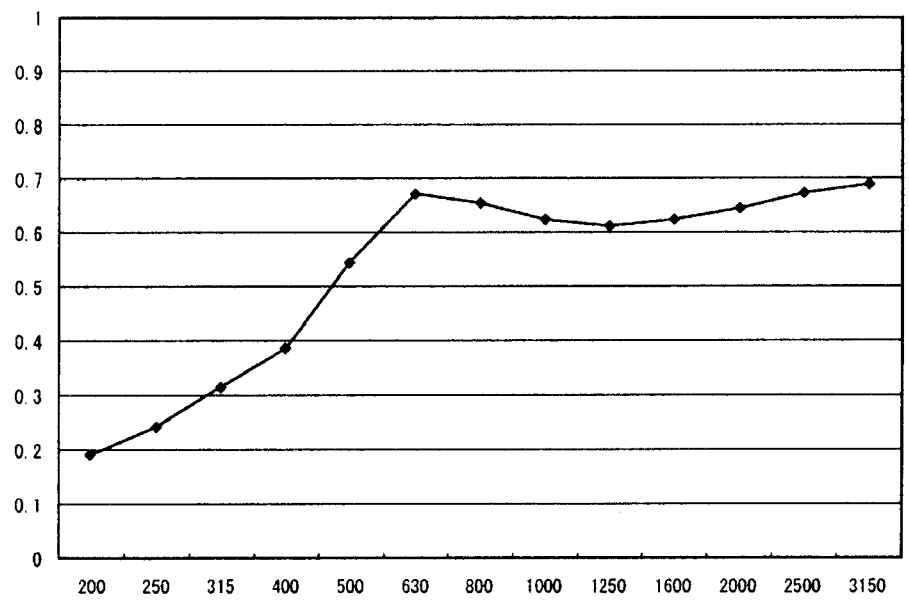
FIG. 30 is a graph indicating the sound absorption rate, at various frequencies, of a sound absorbing body (number of cells: 50, thickness: 240 mm) according to an example according to the present invention.
Figure 31:
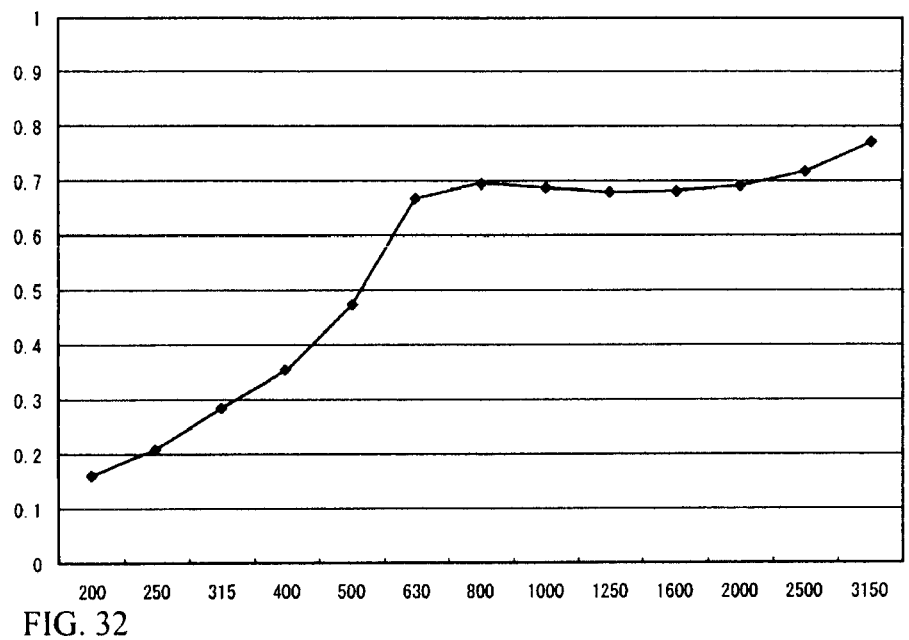
FIG. 31 is a graph indicating the sound absorption rate, at various frequencies, of a sound absorbing body (number of cells: 50, thickness: 210 mm) according to an example according to the present invention.
Figure 32:
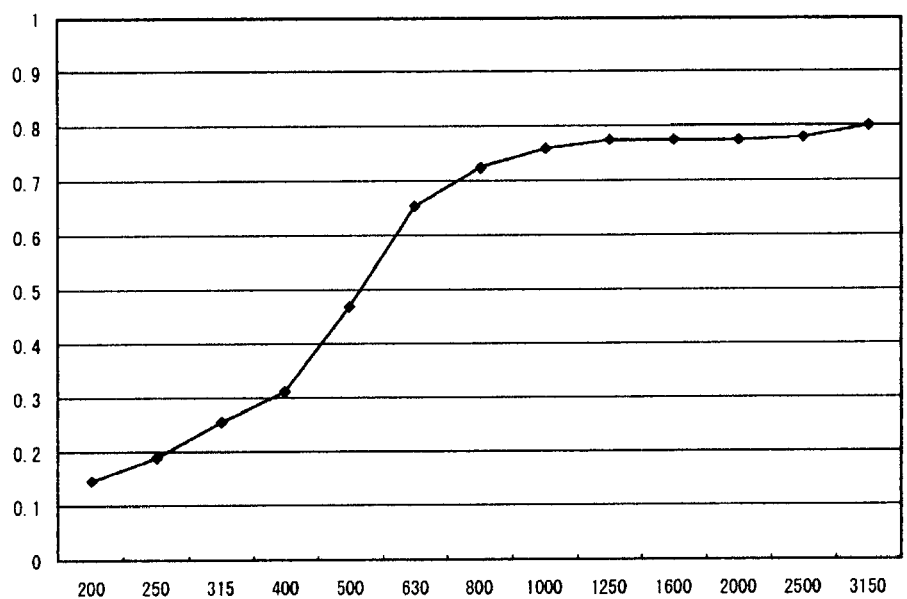
FIG. 32 is a graph indicating the sound absorption rate, at various frequencies, of a sound absorbing body (number of cells: 50, thickness: 180 mm) according to an example according to the present invention.
Figure 33:
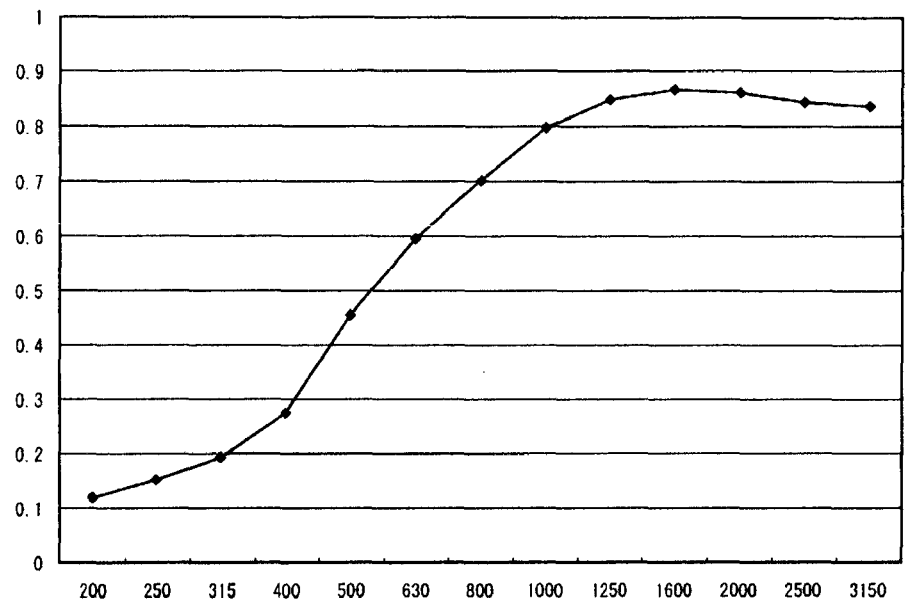
FIG. 33 is a graph indicating the sound absorption rate, at various frequencies, of a sound absorbing body (number of cells: 50, thickness: 150 mm) according to an example according to the present invention.
Figure 34:
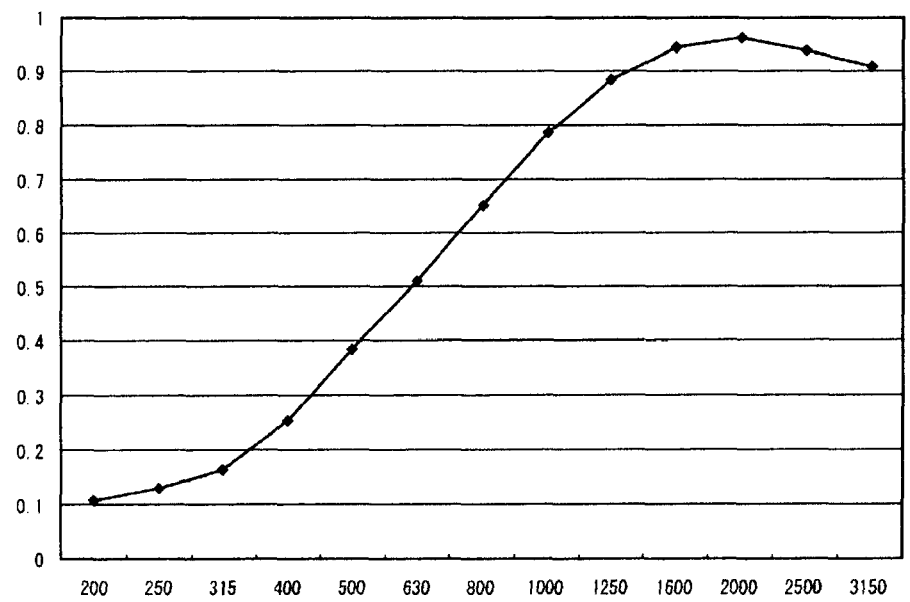
FIG. 34 is a graph indicating the sound absorption rate, at various frequencies, of a sound absorbing body (number of cells: 50, thickness: 120 mm) according to an example according to the present invention.
Figure 35:
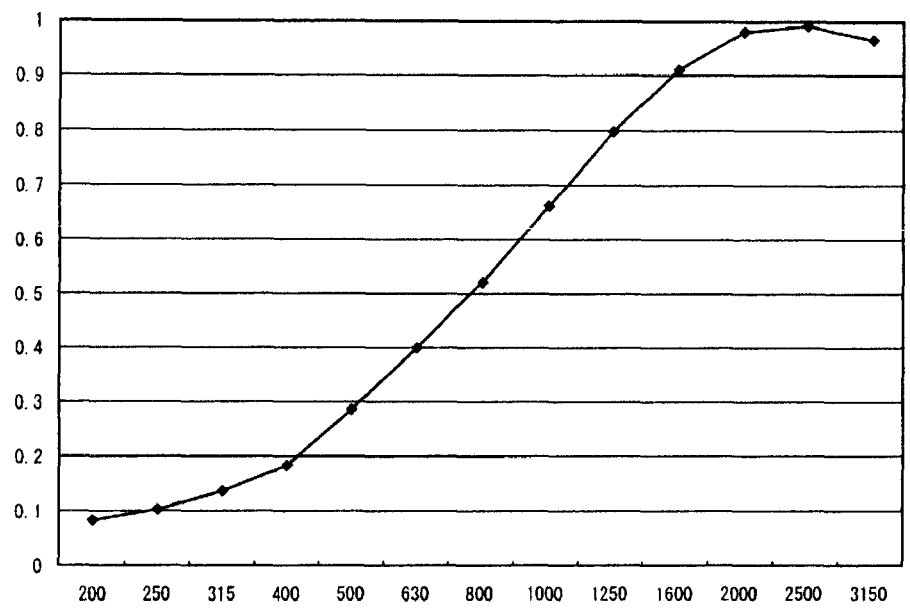
FIG. 35 is a graph indicating the sound absorption rate, at various frequencies, of a sound absorbing body (number of cells: 50, thickness: 90 mm) according to an example according to the present invention.
Figure 36:
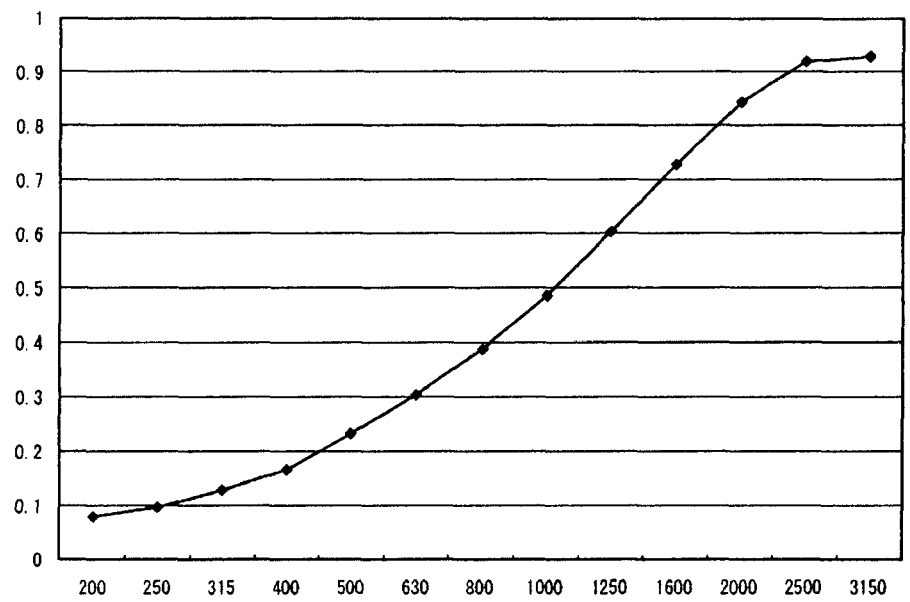
FIG. 36 is a graph indicating the sound absorption rate, at various frequencies, of a sound absorbing body (number of cells: 50, thickness: 60 mm) according to an example according to the present invention.
Figure 37:
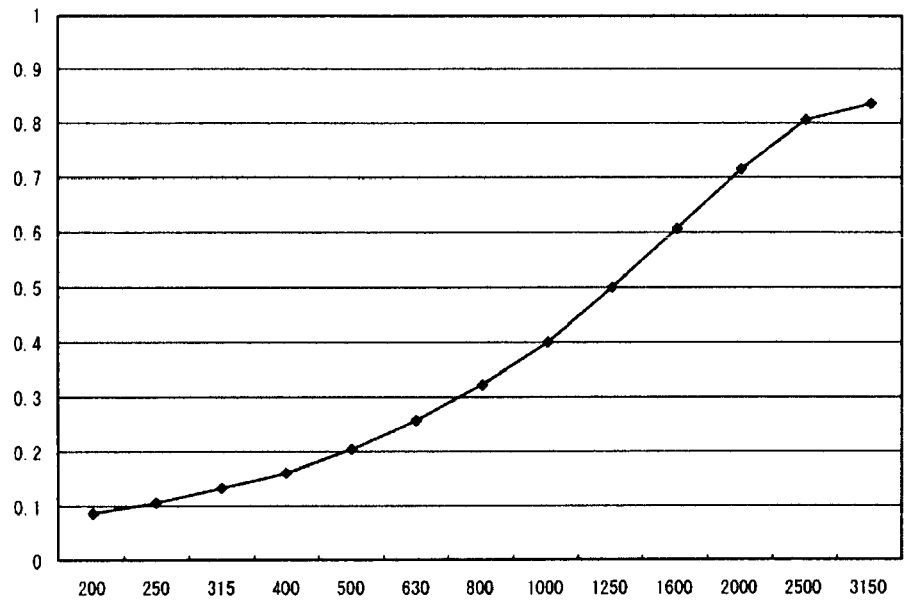
FIG. 37 is a graph indicating the sound absorption rate, at various frequencies, of a sound absorbing body (number of cells: 50, thickness: 45 mm) according to an example according to the present invention.
Figure 38:
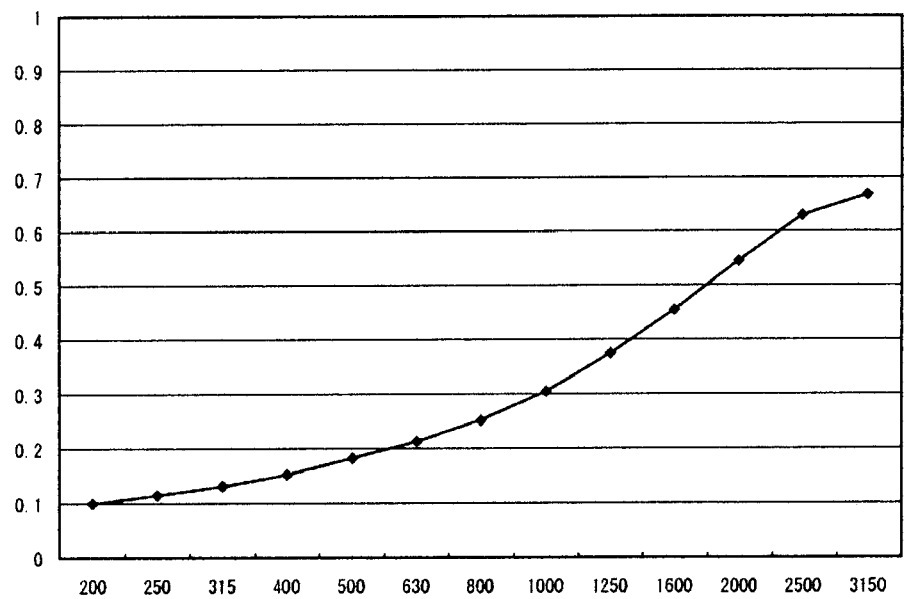
FIG. 38 is a graph indicating the sound absorption rate, at various frequencies, of a non-compressed soft polyurethane foam with 50 cells and a thickness of 30 mm.

FIG. 30 is a graph indicating the sound absorption rate, at various frequencies, of a sound absorbing body (number of cells: 50, thickness: 240 mm) according to an example according to the present invention; FIG. 31 is a graph indicating the sound absorption rate, at various frequencies, of a sound absorbing body (number of cells: 50, thickness: 210 mm) according to an example according to the present invention; FIG. 32 is a graph indicating the sound absorption rate, at various frequencies, of a sound absorbing body (number of cells: 50, thickness: 180 mm) according to an example according to the present invention; FIG. 33 is a graph indicating the sound absorption rate, at various frequencies, of a sound absorbing body (number of cells: 50, thickness: 150 mm) according to an example according to the present invention; FIG. 34 is a graph indicating the sound absorption rate, at various frequencies, of a sound absorbing body (number of cells: 50, thickness: 120 mm) according to an example according to the present invention; FIG. 35 is a graph indicating the sound absorption rate, at various frequencies, of a sound absorbing body (number of cells: 50, thickness: 90 mm) according to an example according to the present invention; FIG. 36 is a graph indicating the sound absorption rate, at various frequencies, of a sound absorbing body (number of cells: 50, thickness: 60 mm) according to an example according to the present invention; FIG. 37 is a graph indicating the sound absorption rate, at various frequencies, of a sound absorbing body (number of cells: 50, thickness: 45 mm) according to an example according to the present invention; and FIG. 38 is a graph indicating the sound absorption rate, at various frequencies, of a non-compressed soft polyurethane foam with 50 cells and a thickness of 30 mm.

Figure 39:
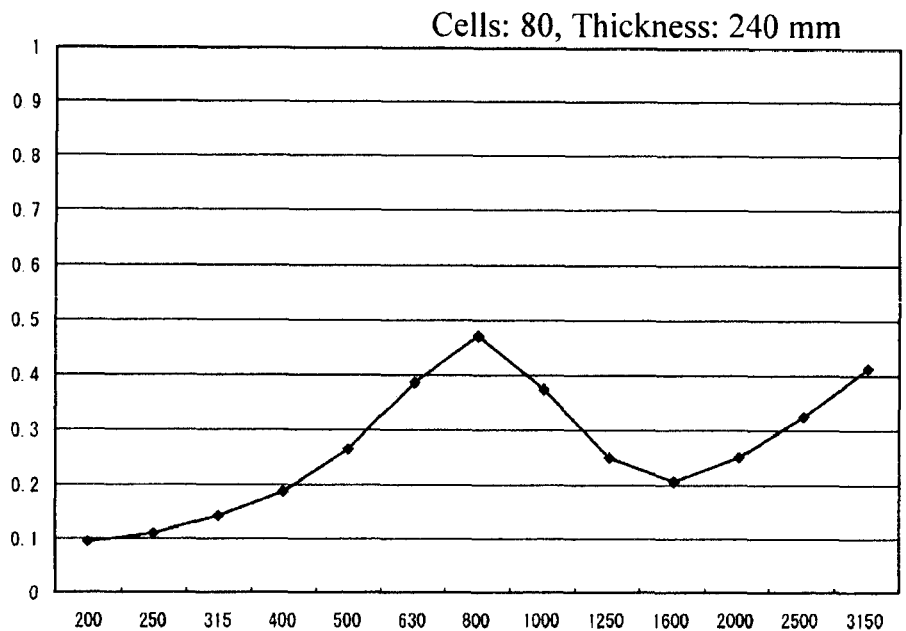
FIG. 39 is a graph indicating the sound absorption rate, at various frequencies, of a sound absorbing body (number of cells: 80, thickness: 240 mm) according to an example according to the present invention.
Figure 40:
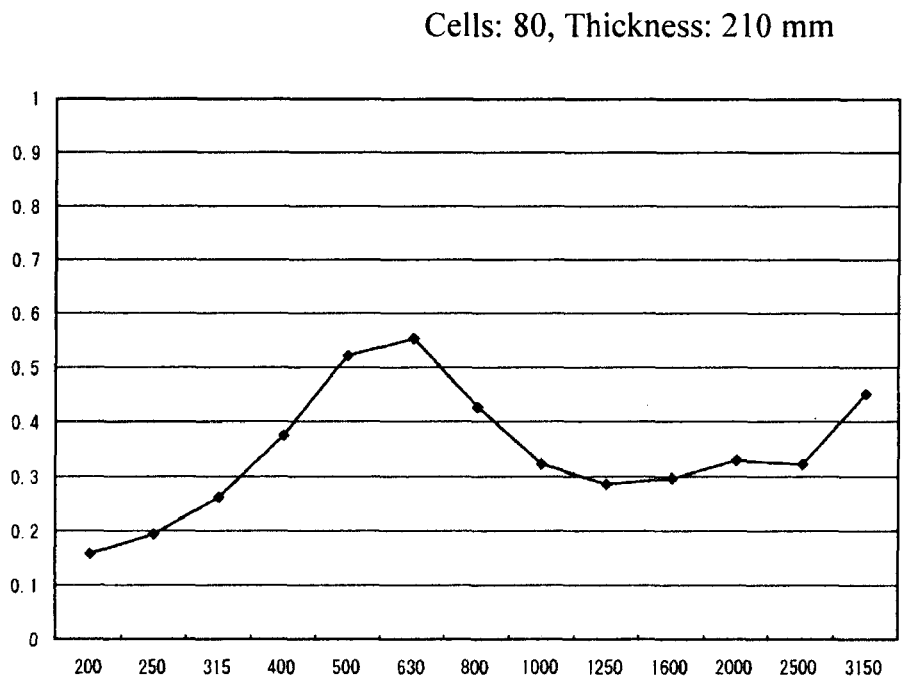
FIG. 40 is a graph indicating the sound absorption rate, at various frequencies, of a sound absorbing body (number of cells: 50, thickness: 210 mm) according to an example according to the present invention.
Figure 41:
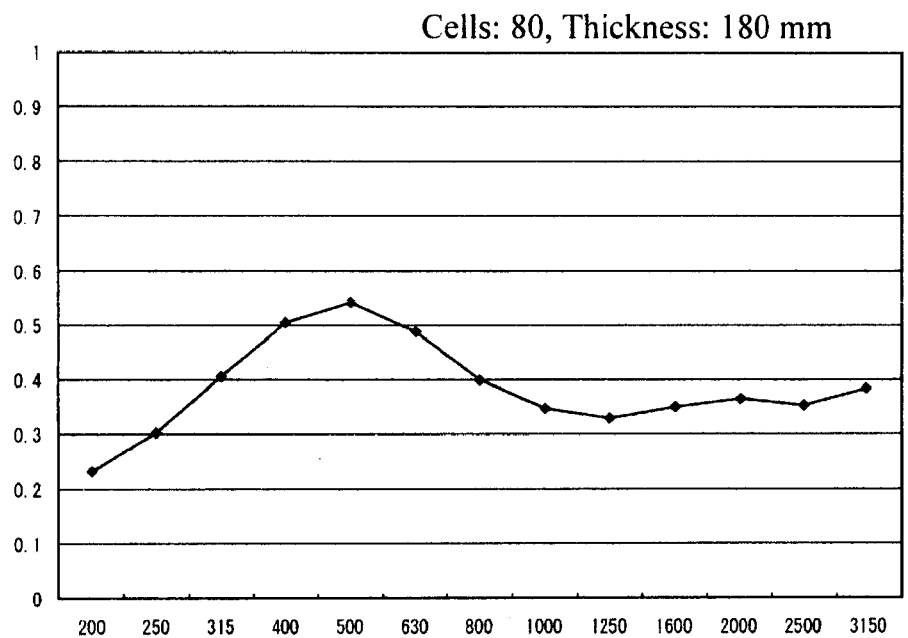
FIG. 41 is a graph indicating the sound absorption rate, at various frequencies, of a sound absorbing body (number of cells: 80, thickness: 180 mm) according to an example according to the present invention.
Figure 42:
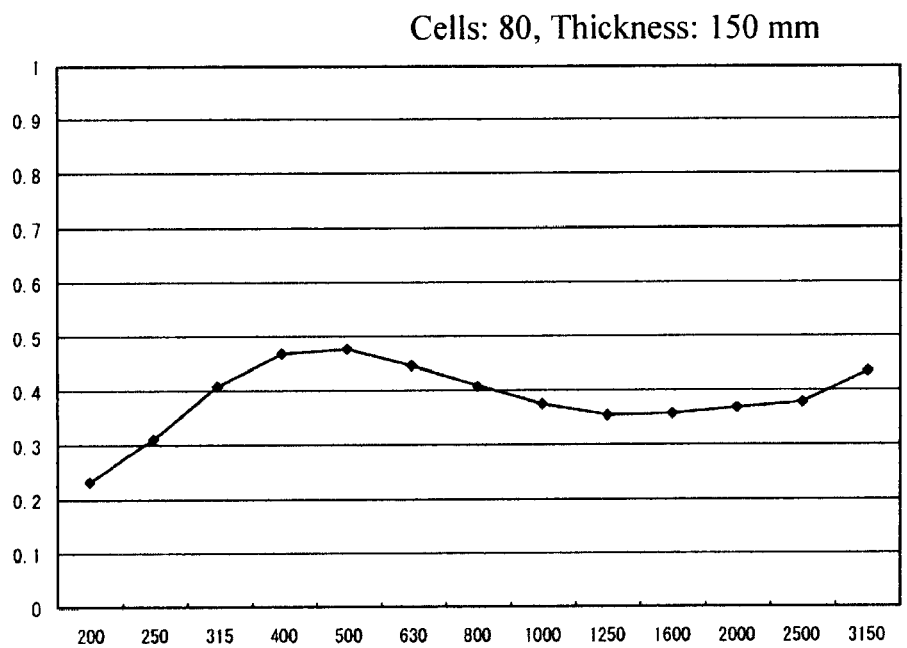
FIG. 42 is a graph indicating the sound absorption rate, at various frequencies, of a sound absorbing body (number of cells: 80, thickness: 150 mm) according to an example according to the present invention.
Figure 43:
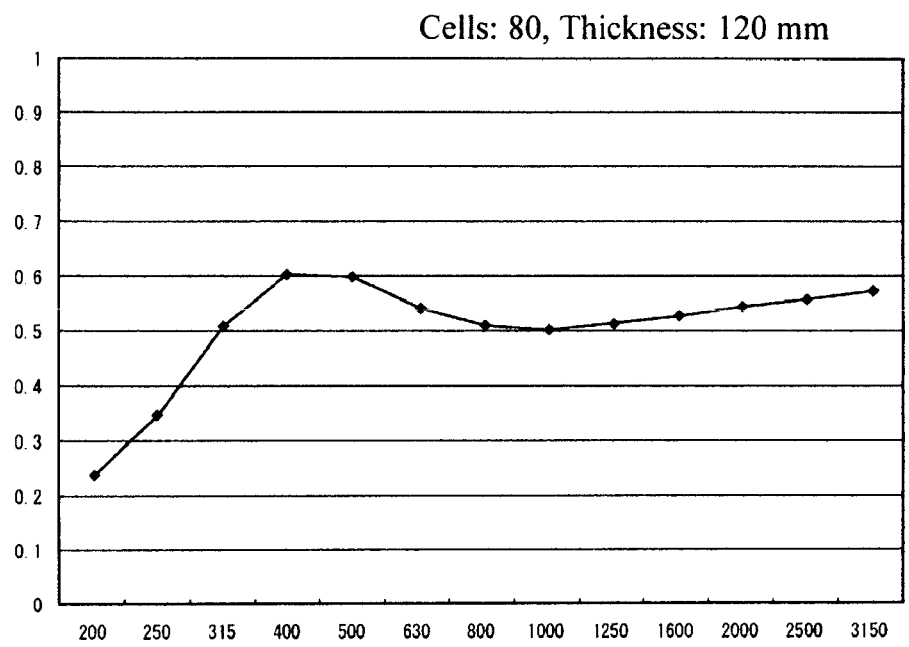
FIG. 43 is a graph indicating the sound absorption rate, at various frequencies, of a sound absorbing body (number of cells: 80, thickness: 120 mm) according to an example according to the present invention.
Figure 44:
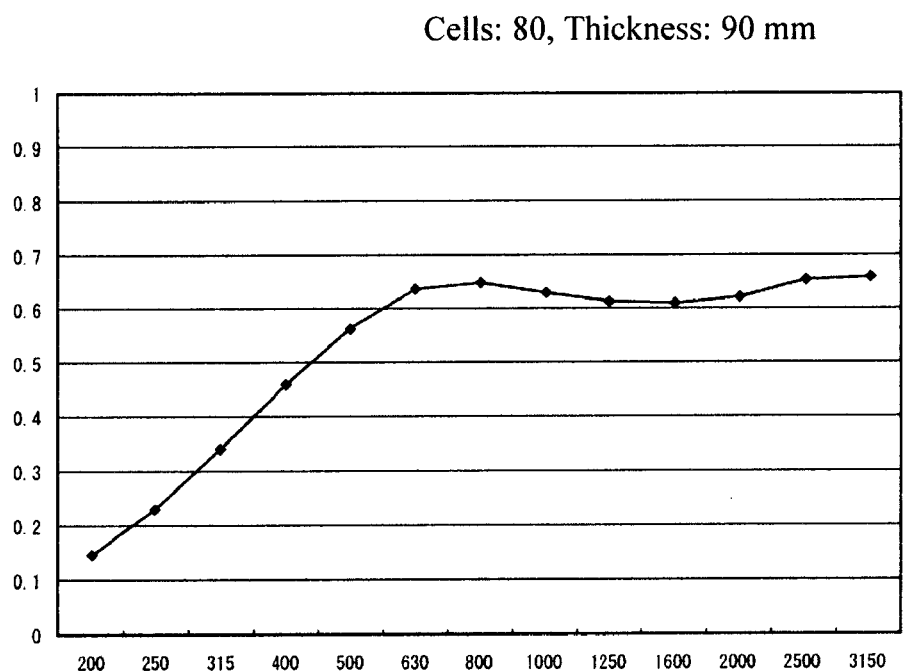
FIG. 44 is a graph indicating the sound absorption rate, at various frequencies, of a sound absorbing body (number of cells: 80, thickness: 90 mm) according to an example according to the present invention.
Figure 45:
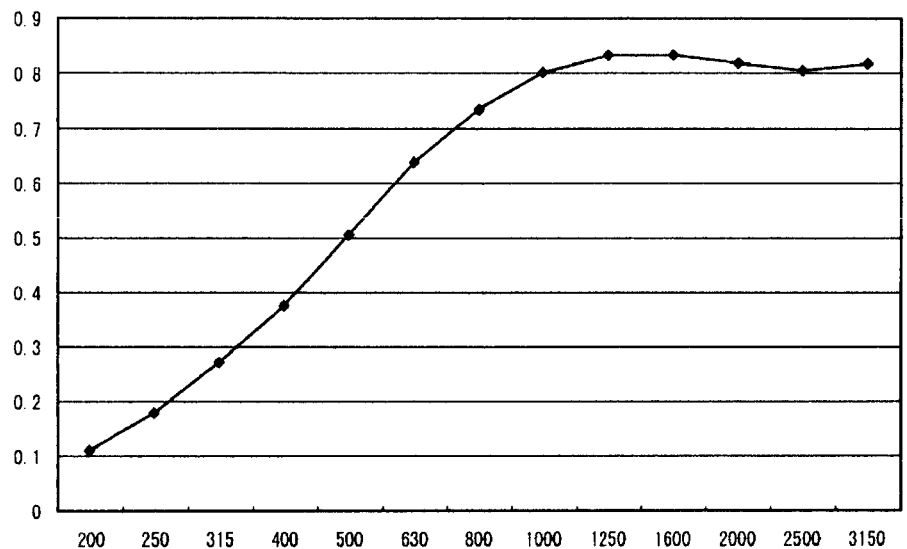
FIG. 45 is a graph indicating the sound absorption rate, at various frequencies, of a sound absorbing body (number of cells: 80, thickness: 60 mm) according to an example according to the present invention.
Figure 46:
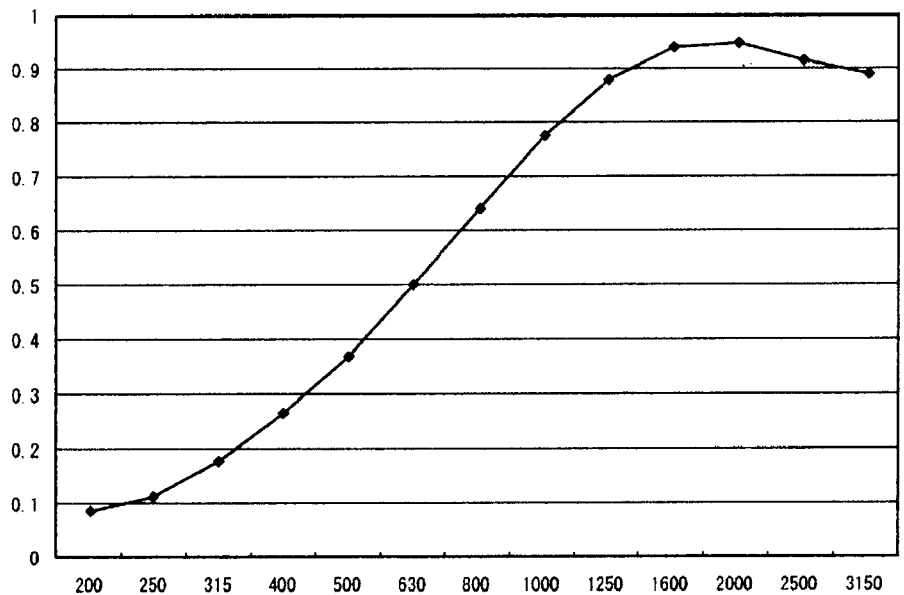
FIG. 46 is a graph indicating the sound absorption rate, at various frequencies, of a sound absorbing body (number of cells: 80, thickness: 45 mm) according to an example according to the present invention.
Figure 47:
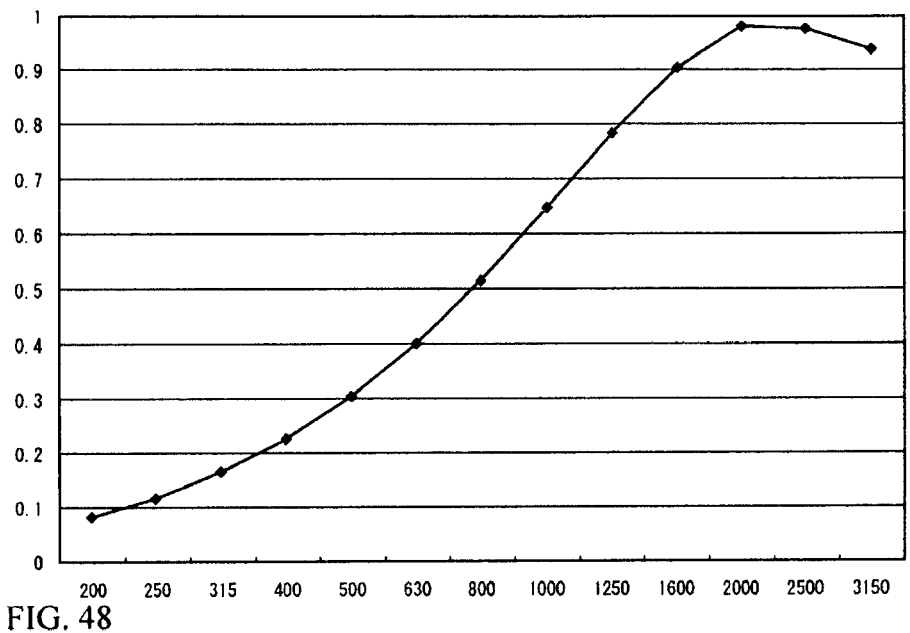
FIG. 47 is a graph indicating the sound absorption rate, at various frequencies, of a non-compressed soft polyurethane foam with 80 cells and a thickness of 30 mm.

FIG. 39 is a graph indicating the sound absorption rate, at various frequencies, of a sound absorbing body (number of cells: 80, thickness: 240 mm) according to an example according to the present invention; FIG. 40 is a graph indicating the sound absorption rate, at various frequencies, of a sound absorbing body (number of cells: 50, thickness: 210 mm) according to an example according to the present invention; FIG. 41 is a graph indicating the sound absorption rate, at various frequencies, of a sound absorbing body (number of cells: 80, thickness: 180 mm) according to an example according to the present invention; FIG. 42 is a graph indicating the sound absorption rate, at various frequencies, of a sound absorbing body (number of cells: 80, thickness: 150 mm) according to an example according to the present invention; FIG. 43 is a graph indicating the sound absorption rate, at various frequencies, of a sound absorbing body (number of cells: 80, thickness: 120 mm) according to an example according to the present invention; FIG. 44 is a graph indicating the sound absorption rate, at various frequencies, of a sound absorbing body (number of cells: 80, thickness: 90 mm) according to an example according to the present invention; FIG. 45 is a graph indicating the sound absorption rate, at various frequencies, of a sound absorbing body (number of cells: 80, thickness: 60 mm) according to an example according to the present invention; FIG. 46 is a graph indicating the sound absorption rate, at various frequencies, of a sound absorbing body (number of cells: 80, thickness: 45 mm) according to an example according to the present invention; and FIG. 47 is a graph indicating the sound absorption rate, at various frequencies, of a non-compressed soft polyurethane foam with 80 cells and a thickness of 30 mm.

Figure 48:
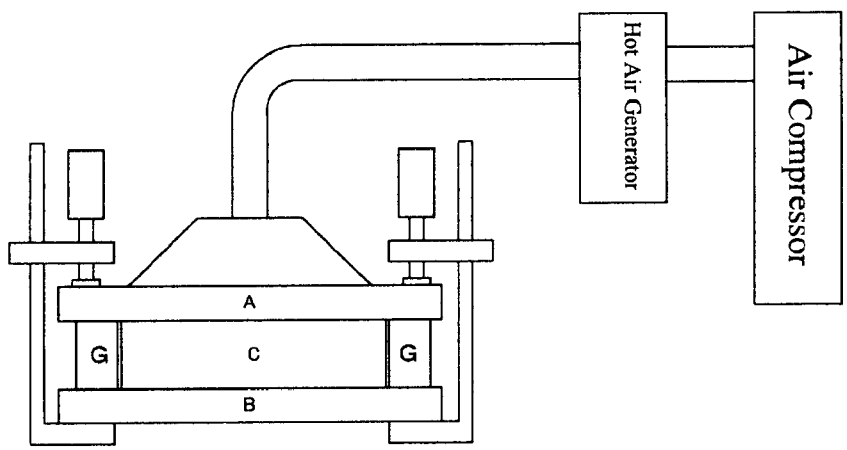
FIG. 48 is a schematic front view diagram of another form of embodiment of a sound absorbing body manufacturing method according to an example according to the present invention.
Figure 49:
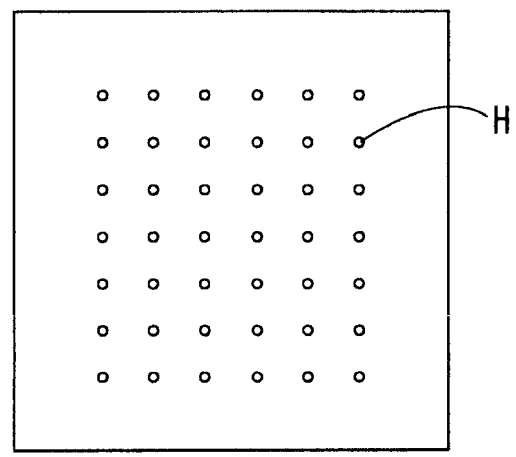
FIG. 49 is a schematic plan view diagram of a molding die used in a sound absorbing body manufacturing method according to an example according to the present invention.

FIG. 48 is a schematic front view diagram of another form of embodiment of a sound absorbing body manufacturing method according to an example according to the present invention and FIG. 49 is a schematic plan view diagram of a molding die used in a sound absorbing body manufacturing method according to an example according to the present invention.

Note that the "thickness" in "XX mm thick" in the explanations of the drawings, above, refers to the thickness of the soft polyurethane foam as the material prior to compression.

Moreover, the number of cells refers to the number of holes that are cut by a straight line when a straight line is drawn with a length of 25 mm on a cross section of the material (which is, in the present application, soft polyurethane foam). That is, if a straight line that has a length of 25 mm, drawn on a cross section of the soft polyurethane foam, cuts across 50 holes, then the "number of cells" would be 50.

Note that this cell count is defined in K6400-1, "Soft Foam Materials How to Calculate Physical Properties—Part 1: General Rules Appendix I" of JIS K6400.

Moreover, while in the experiments below the MF Series, which is a filter material from Inoac Corp., was used as the soft polyurethane foam, a soft polyurethane foam from another company can be used instead, of course.

First, with the molding dies A and B in an electric furnace, the temperature was raised to the 180° C. set point, and then the soft polyurethane foam C (length: 150 mm×width: 400 ram×thickness: 120 mm) was held between the molding dies A and B, as illustrated in FIG. 1, and the clamp was fastened as illustrated in FIG. 2, to perform the compression. At this time, in order to have the thickness during compression the 30 mm, metal pieces D and E were placed between the molding dies A and B, and on both sides of the urethane foam C. After this, after heating for 60 min. within the electric furnace at 180° C. while in this state, the fastening clamp was released and the hot compression molded urethane foam C was removed, to thereby manufacture the sound absorbing body according to the present form of embodiment.

Note that the measurement of the sound absorption rate used a measurement method according to the MS Standard, ES A 1405-2, "Sound Absorption Rate and Impedance Measurements in Acoustic Tubes—Part 2: Transfer Function Method."

Following this, the absorption rates at various frequencies (units: Hz) for sound absorbing bodies obtained from soft polyurethane foams of five different cell counts (13 cells, 20 cells, 40 cells, 50 cells, and 80 cells) and a different thicknesses (240 mm, 210 mm, 180 mm, 150 mm, 120 mm, 90 nm, 60 mm, and 45 mm), each compressed to a thickness of 30 mm, where compared to the absorption rates at various frequencies (units: Hz) for a 30 mm non-compressed soft polyurethane foam that was the same soft polyurethane foam material.

Note that the compression rate when the soft polyurethane foam with a thickness of 240 mm was compressed to 30 mm was 1/8, the compression rate when the soft polyurethane foam with a thickness of 210 mm was compressed to 30 mm was 1/7, the compression rate when the soft polyurethane foam with a thickness of 180 mm was compressed to 30 mm was 1/6, the compression rate when the soft polyurethane foam with a thickness of 150 mm was compressed to 30 mm was 1/5, the compression rate when the soft polyurethane foam with a thickness of 120 min was compressed to 30 mm was 1/4, the compression rate when the soft polyurethane foam with a thickness of 90 mm was compressed to 30 mm was 1/3, the compression rate when the soft polyurethane foam with a thickness of 60 min was compressed to 30 mm was 1/2, and the compression rate when the soft polyurethane foam with a thickness of 45 mm was compressed to 30 mm was 1/1.5.

The sound absorption rates (coefficient α) at various frequencies of the sound absorbing bodies obtained through compressing, to a thickness of 30 mm, soft polyurethane foam with 13 cells and with thicknesses of 240 mm, 210 mm, 180 mm, 150 mm, 120 mm, 90 mm, 60 mm, and 45 mm, and the sound absorption rates at various frequencies of similar soft polyurethane foam with 13 cells and a thickness of 30 mm were compared. Note that these are shown in FIG. 3 through FIG. 11.

| | FIG. 3 | FIG. 4 | FIG. 5 | FIG. 6 | FIG. 7 | FIG. 8 | FIG. 9 | FIG. 10 | FIG. 11 |
|---|---|---|---|---|---|---|---|---|---|
| Freq. | 240 mm | 210 mm | 180 mm | 150 mm | 120 mm | 90 mm | 60 mm | 45 mm | 30 mm |
| 200 | 0.06916 | 0.06816 | 0.07850 | 0.06862 | 0.06653 | 0.06507 | 0.05546 | 0.04879 | 0.04078 |
| 250 | 0.09170 | 0.08551 | 0.09261 | 0.08220 | 0.07623 | 0.07449 | 0.06114 | 0.05349 | 0.04506 |
| 315 | 0.12528 | 0.11291 | 0.11343 | 0.10098 | 0.09057 | 0.08687 | 0.06896 | 0.06044 | 0.04995 |
| 400 | 0.17250 | 0.15041 | 0.14231 | 0.12546 | 0.10879 | 0.10165 | 0.07754 | 0.06976 | 0.05555 |
| 500 | 0.23174 | 0.19993 | 0.18497 | 0.15649 | 0.12931 | 0.11920 | 0.08604 | 0.08086 | 0.06047 |
| 630 | 0.32676 | 0.26702 | 0.23853 | 0.19616 | 0.16055 | 0.14252 | 0.09829 | 0.09735 | 0.06644 |
| 800 | 0.46740 | 0.37528 | 0.32376 | 0.25730 | 0.20542 | 0.17100 | 0.11230 | 0.11350 | 0.07171 |
| 1000 | 0.65172 | 0.52284 | 0.44768 | 0.34691 | 0.26983 | 0.20923 | 0.13151 | 0.12168 | 0.07829 |
| 1250 | 0.84309 | 0.70460 | 0.61040 | 0.47279 | 0.35548 | 0.26645 | 0.16009 | 0.13166 | 0.08985 |
| 1600 | 0.97530 | 0.88660 | 0.78729 | 0.63783 | 0.47855 | 0.35693 | 0.20877 | 0.16260 | 0.11490 |
| 2000 | 0.96659 | 0.97080 | 0.91031 | 0.79476 | 0.62550 | 0.47675 | 0.27853 | 0.21325 | 0.14941 |
| 2500 | 0.83945 | 0.89544 | 0.90299 | 0.83407 | 0.71496 | 0.56996 | 0.35483 | 0.26647 | 0.18390 |
| 3150 | 0.75374 | 0.79743 | 0.83238 | 0.77908 | 0.71121 | 0.56999 | 0.40456 | 0.29870 | 0.20477 |

The sound absorption rates at various frequencies of the sound absorbing bodies obtained through compressing, to a thickness of 30 mm, soft polyurethane foam with 20 cells and with thicknesses of 240 mm, 210 mm, 180 mm, 150 mm, 120 mm, 90 mm, 60 mm, and 45 mm, and the sound absorption rates at various frequencies of similar soft polyurethane foam with 20 cells and a thickness of 30 mm were compared. Note that these are shown in FIG. 12 through FIG. 20.

| | FIG. 12 | FIG. 13 | FIG. 14 | FIG. 15 | FIG. 16 | FIG. 17 | FIG. 18 | FIG. 19 | FIG. 20 |
|---|---|---|---|---|---|---|---|---|---|
| Freq. | 240 mm | 210 mm | 180 mm | 150 mm | 120 mm | 90 mm | 60 mm | 45 m | 30 mm |
| 200 | 0.08177 | 0.07481 | 0.07262 | 0.06817 | 0.07174 | 0.06934 | 0.06229 | 0.05686 | 0.04689 |
| 250 | 0.11127 | 0.09843 | 0.09582 | 0.08712 | 0.08824 | 0.08407 | 0.07227 | 0.06294 | 0.05269 |
| 315 | 0.15995 | 0.14061 | 0.13300 | 0.11723 | 0.11141 | 0.10284 | 0.08447 | 0.07088 | 0.05822 |
| 400 | 0.22367 | 0.19601 | 0.18532 | 0.15712 | 0.14318 | 0.12508 | 0.09810 | 0.07992 | 0.06497 |
| 500 | 0.31322 | 0.27039 | 0.24963 | 0.20392 | 0.18253 | 0.15013 | 0.11371 | 0.08966 | 0.07107 |
| 630 | 0.45929 | 0.39524 | 0.34081 | 0.27613 | 0.23718 | 0.18649 | 0.13443 | 0.10314 | 0.08047 |
| 800 | 0.62716 | 0.54962 | 0.47743 | 0.37682 | 0.30887 | 0.23400 | 0.16067 | 0.12006 | 0.09261 |
| 1000 | 0.79560 | 0.72550 | 0.64010 | 0.50822 | 0.41040 | 0.29850 | 0.19728 | 0.14396 | 0.10984 |
| 1250 | 0.92148 | 0.88714 | 0.81254 | 0.66503 | 0.54649 | 0.38923 | 0.24859 | 0.17887 | 0.13643 |
| 1600 | 0.96851 | 0.98048 | 0.94969 | 0.83560 | 0.70926 | 0.51122 | 0.32437 | 0.23246 | 0.17825 |
| 2000 | 0.92085 | 0.96546 | 0.99396 | 0.95364 | 0.85176 | 0.65417 | 0.42775 | 0.30718 | 0.23317 |
| 2500 | 0.83565 | 0.87508 | 0.93491 | 0.94577 | 0.88553 | 0.75553 | 0.53461 | 0.38982 | 0.28679 |
| 3150 | 0.79190 | 0.80362 | 0.87419 | 0.88217 | 0.83867 | 0.76962 | 0.59022 | 0.44837 | 0.31585 |

The sound absorption rates at various frequencies of the sound absorbing bodies obtained through compressing, to a thickness of 30 mm, soft polyurethane foam with 40 cells and with thicknesses of 240 mm, 210 mm, 180 mm, 150 mm, 120 mm, 90 mm, 60 mm, and 45 mm, and the sound absorption rates at various frequencies of similar soft polyurethane foam with 40 cells and a thickness of 30 mm were compared. Note that these are shown in FIG. 21 through FIG. 29.

| | FIG. 21 | FIG. 22 | FIG. 23 | FIG. 24 | FIG. 25 | FIG. 26 | FIG. 27 | FIG. 28 | FIG. 29 |
|---|---|---|---|---|---|---|---|---|---|
| Freq. | 240 mm | 210 mm | 180 mm | 150 mm | 120 mm | 90 mm | 60 mm | 45 mm | 30 mm |
| 200 | 0.14851 | 0.12345 | 0.11370 | 0.09691 | 0.07958 | 0.07435 | 0.07066 | 0.07357 | 0.08478 |
| 250 | 0.19813 | 0.16876 | 0.15188 | 0.12504 | 0.10648 | 0.09753 | 0.08958 | 0.08869 | 0.09646 |
| 315 | 0.27088 | 0.24127 | 0.21355 | 0.16276 | 0.14931 | 0.13244 | 0.11562 | 0.11003 | 0.10975 |
| 400 | 0.34902 | 0.31474 | 0.27686 | 0.25400 | 0.19465 | 0.17289 | 0.15098 | 0.13299 | 0.12391 |
| 500 | 0.52141 | 0.43419 | 0.40141 | 0.37533 | 0.29721 | 0.24383 | 0.19528 | 0.16222 | 0.14072 |
| 630 | 0.65822 | 0.62872 | 0.57775 | 0.50316 | 0.43017 | 0.33286 | 0.24773 | 0.19717 | 0.16229 |
| 800 | 0.71181 | 0.72022 | 0.70048 | 0.64026 | 0.56945 | 0.43707 | 0.31415 | 0.23966 | 0.18989 |
| 1000 | 0.72141 | 0.76441 | 0.79400 | 0.77914 | 0.71859 | 0.56588 | 0.39774 | 0.29584 | 0.22728 |
| 1250 | 0.71889 | 0.78350 | 0.85302 | 0.88397 | 0.85278 | 0.70560 | 0.50171 | 0.36857 | 0.27973 |
| 1600 | 0.71337 | 0.77911 | 0.86532 | 0.93942 | 0.94695 | 0.84441 | 0.62827 | 0.46491 | 0.35435 |
| 2000 | 0.70805 | 0.76542 | 0.85019 | 0.94770 | 0.98137 | 0.95137 | 0.76348 | 0.58177 | 0.44687 |
| 2500 | 0.72716 | 0.76585 | 0.83428 | 0.92751 | 0.95472 | 0.98315 | 0.85674 | 0.68599 | 0.52833 |
| 3150 | 0.78256 | 0.79534 | 0.85016 | 0.91167 | 0.91535 | 0.95775 | 0.87375 | 0.72842 | 0.56443 |

The sound absorption rates at various frequencies of the sound absorbing bodies obtained through compressing, to a thickness of 30 mm, soft polyurethane foam with 50 cells and with thicknesses of 240 mm, 210 mm, 180 mm, 150 mm, 120 mm, 90 mm, 60 mm, and 45 mm, and the sound absorption rates at various frequencies of similar soft polyurethane foam with 50 cells and a thickness of 30 mm were compared. Note that these are shown in FIG. 30 through FIG. 38.

thickness of 30 mm had mostly low absorption rates, but had remarkable increases in absorption rates through compression, as illustrated in FIG. 3 through FIG. 7.

Moreover, as illustrated in FIG. 21 through FIG. 28, for the material with 40 cells, it was discovered that compression increased the absorption rates in the range from 630 Hz to 2000 Hz.

| | FIG. 30 | FIG. 31 | FIG. 32 | FIG. 33 | FIG. 34 | FIG. 35 | FIG. 36 | FIG. 37 | FIG. 38 |
|---|---|---|---|---|---|---|---|---|---|
| Freq. | 240 mm | 210 mm | 180 mm | 150 mm | 120 mm | 90 mm | 60 mm | 45 mm | 30 mm |
| 200 | 0.19051 | 0.16278 | 0.14553 | 0.12059 | 0.10366 | 0.08412 | 0.07969 | 0.08456 | 0.09712 |
| 250 | 0.24146 | 0.20992 | 0.18779 | 0.15345 | 0.12811 | 0.10683 | 0.09865 | 0.10479 | 0.11311 |
| 315 | 0.31455 | 0.28303 | 0.25251 | 0.19611 | 0.16054 | 0.13943 | 0.12960 | 0.13116 | 0.13159 |
| 400 | 0.38175 | 0.35146 | 0.31002 | 0.27583 | 0.25156 | 0.18527 | 0.16815 | 0.16086 | 0.15360 |
| 500 | 0.54523 | 0.47419 | 0.46711 | 0.45715 | 0.38072 | 0.29006 | 0.23418 | 0.20470 | 0.18238 |
| 630 | 0.67259 | 0.66734 | 0.65197 | 0.59589 | 0.51000 | 0.40053 | 0.30692 | 0.25722 | 0.21214 |
| 800 | 0.65614 | 0.69736 | 0.72547 | 0.70612 | 0.64793 | 0.52499 | 0.39035 | 0.31933 | 0.25098 |
| 1000 | 0.62602 | 0.68803 | 0.75847 | 0.79980 | 0.78158 | 0.66696 | 0.48969 | 0.39955 | 0.30325 |
| 1250 | 0.61333 | 0.68041 | 0.77429 | 0.85196 | 0.88215 | 0.80178 | 0.60315 | 0.49875 | 0.37365 |
| 1600 | 0.62327 | 0.68229 | 0.77490 | 0.86871 | 0.94325 | 0.91429 | 0.72862 | 0.60723 | 0.45389 |
| 2000 | 0.64562 | 0.69413 | 0.77332 | 0.86219 | 0.95918 | 0.98367 | 0.84695 | 0.71830 | 0.54464 |
| 2500 | 0.67364 | 0.71936 | 0.78051 | 0.84657 | 0.93606 | 0.99434 | 0.92075 | 0.80676 | 0.62932 |
| 3150 | 0.69144 | 0.77250 | 0.80130 | 0.83823 | 0.90919 | 0.96904 | 0.93335 | 0.83898 | 0.66787 |

The sound absorption rates at various frequencies of the sound absorbing bodies obtained through compressing, to a thickness of 30 mm, soft polyurethane foam with 80 cells and with thicknesses of 240 mm, 210 mm, 180 mm, 150 mm, 120 mm, 90 mm, 60 mm, and 45 mm, and the sound absorption rates at various frequencies of similar soft polyurethane foam with 80 cells and a thickness of 30 mm were compared. Note that these are shown in FIG. 39 through FIG. 47.

In this way, it is possible to increase the absorption rate through compressing the soft polyurethane foam. In particular, this tendency was seen strikingly when the degree of compression was high.

Note that while the reason why the absorption rate is increased by the hot compression of the soft polyurethane foam is not entirely understood, it is believed that the reason is an increase in the number of internal air spaces per-unit-

| | FIG. 39 | FIG. 40 | FIG. 41 | FIG. 42 | FIG. 43 | FIG. 44 | FIG. 45 | FIG. 46 | FIG. 47 |
|---|---|---|---|---|---|---|---|---|---|
| Freq. | 240 mm | 210 mm | 180 mm | 150 mm | 120 mm | 90 mm | 60 mm | 45 mm | 30 mm |
| 200 | 0.09433 | 0.15708 | 0.23046 | 0.23490 | 0.23653 | 0.14876 | 0.10741 | 0.08177 | 0.08161 |
| 250 | 0.11044 | 0.19338 | 0.30013 | 0.31232 | 0.34931 | 0.22945 | 0.17731 | 0.10814 | 0.11311 |
| 315 | 0.14081 | 0.25877 | 0.40409 | 0.40834 | 0.51023 | 0.34369 | 0.27097 | 0.17405 | 0.16339 |
| 400 | 0.18786 | 0.37195 | 0.50290 | 0.46941 | 0.60527 | 0.45835 | 0.37329 | 0.26443 | 0.22510 |
| 500 | 0.26438 | 0.52017 | 0.53975 | 0.47945 | 0.59975 | 0.56142 | 0.50459 | 0.36709 | 0.30371 |
| 630 | 0.38663 | 0.55405 | 0.48692 | 0.44908 | 0.54546 | 0.64072 | 0.63683 | 0.49987 | 0.39980 |
| 800 | 0.47294 | 0.42620 | 0.39748 | 0.41013 | 0.51013 | 0.65249 | 0.73573 | 0.64069 | 0.51553 |
| 1000 | 0.37721 | 0.31904 | 0.34492 | 0.37583 | 0.50289 | 0.63262 | 0.80106 | 0.77469 | 0.64911 |
| 1250 | 0.25072 | 0.28415 | 0.32925 | 0.35629 | 0.51260 | 0.61490 | 0.83115 | 0.88035 | 0.78638 |
| 1600 | 0.20670 | 0.29574 | 0.34825 | 0.35960 | 0.52940 | 0.61190 | 0.83289 | 0.94185 | 0.90904 |
| 2000 | 0.24978 | 0.32866 | 0.36591 | 0.36941 | 0.54299 | 0.62484 | 0.81690 | 0.94980 | 0.98247 |
| 2500 | 0.32476 | 0.31953 | 0.35197 | 0.37748 | 0.55829 | 0.65332 | 0.80469 | 0.91588 | 0.97691 |
| 3150 | 0.41394 | 0.45120 | 0.38436 | 0.43849 | 0.57420 | 0.65974 | 0.81784 | 0.89191 | 0.93850 |

As is clear from these data, the greater the compression rate, that is, the thicker the original soft polyurethane foam, the higher the absorption rate across all frequency bands.

This effect was the same even when the number of cells was different. However, as a whole there seem to be a tendency for higher absorption rates to the observed the higher the number of cells. Moreover, there was a tendency for the absorption rate to fall if the compression rate was too high. The reason why the absorption rate would fall if the compression rate was too high is not entirely clear, but it is believed to be because the air spaces within the soft polyurethane foam are crushed.

In particular, as shown in FIG. 11, it was discovered that the soft polyurethane foam with 13 cells and an uncompressed volume of the soft polyurethane foam due to the hot compression, and a change in the shape of the air spaces.

Note that, because of this, it is possible to obtain a sound absorbing body having a broader range of frequency characteristics through combinations of several urethane foams having different levels of compression.

Moreover, it is possible to absorb sound with emphases on specific frequencies through adjusting the combinations of cells and compression rates.

Note that while the example has the benefits set forth above due to the structure set forth above, various appropriate design changes are possible within the scope of the spirit and intent of the present invention.

That is, while the explanation in the example set forth above was for five different cell counts (13, 20, 40, 50, and 80), the present invention is not limited thereto, and can be applied to a soft polyurethane foam having an appropriate number of cells.

Moreover, in the example set forth above, the explanation was for when the shape of the hot compression molded die surface is flat, but the present invention is not limited thereto, but rather die surfaces with recessed and protruding portions may be used, making it possible to cause there to be recessed and protruding portions on the surfaces of the product that is obtained, or there may be desired designs on the die surfaces, making it possible to provide desired designs on the surfaces of the product that is obtained.

Moreover, it is also possible to apply a film to the surface of the hot compression molded product, to increase the sound absorbing effect in the middle and low range, and also design changes are possible wherein a fabric, or the like, is wrapped onto the surface, a flocking process is performed on the surface, or a painting/coating process is performed on the surface.

Moreover, it is also possible to provide a hole H in the molding dies A and B that perform the hot compression molding of the soft polyurethane foam, to shorten the operating time of the hot compression molding through providing hot air into this hole H.

For example, as illustrated in FIG. 48, a plurality of holes H is provided in the parts of the molding dies A and B that contact the soft polyurethane foam C, and hot air is provided from a hot air generating device into these holes. At this time, the entirety of the soft polyurethane foam C may be covered with a cover G so that the there will be no leakage of hot air from the soft polyurethane foam C. This cover G is not only for preventing leakage of the hot air, but also has the role of causing the thickness of the soft polyurethane foam C at the time of compression to be 30 mm. Note that, for purposes of explanation, a portion of the cover G is cut away in FIG. 48, to show the soft polyurethane foam C that is therein.

An MF Series soft polyurethane foam with a cell count of 40 and a thickness of 120 mm (a square with a length of 180 mm and a width of 180 mm), which is a filter material from Inoac Corp., was placed in the device illustrated in FIG. 48, and hot air at 180° C. was, provided at a rate of 200 liter/min. at 0.1 MPa from the top molding die A, for mold the sound absorbing body in 10 minutes. The hot air is exhausted from the holes H in the bottom molding die B, after passing through the soft polyurethane foam.

Note that 36 holes H are provided in the molding dies A and B with diameters of 2 mm and spacing of 30 mm.

In contrast, if no hot air is provided, the molding of the sound absorbing body takes 50 minutes.

Providing hot air in this way at the time of the hot compression of the soft polyurethane foam greatly reduces the time required for molding, when compared to heating by the molding dies alone.

Note that while the hot here was provided from the top molding die A alone, the hot air may instead be provided simultaneously from both the top and bottom molding dies A and B, or the holes H may be provided in either the top or the bottom molding dies A and B.

The invention claimed is:

1. A method of manufacturing a sound absorbing body, comprising the steps of:
    manufacturing the sound absorbing body through hot compression molding of a raw material of soft polyurethane foam to a volume ratio of between 1/1.5 and 1/8, wherein the raw material is compressed and heated during the hot compression molding in order to improve a sound absorbing effect,
    providing a plurality of holes in a molding die where the soft polyurethane foam contacts, and
    providing hot air to the holes at a time of hot compression of the soft polyurethane foam, wherein the raw material is compressed and heated by air during the hot compression molding.

2. The method of manufacturing a sound absorbing body according to claim 1, wherein the raw material is heated at a temperature between 150 and 240° C.

* * * * *